US009700472B2

(12) United States Patent
Gierse et al.

(10) Patent No.: US 9,700,472 B2
(45) Date of Patent: Jul. 11, 2017

(54) ADJUSTMENT DEVICE FOR VEHICLE SEATS

(71) Applicant: In-Tra-Tec GmbH, Remscheid (DE)

(72) Inventors: Klaus Gierse, Radevormwald (DE); Georges Gautschi, St. Niklaus (CH)

(73) Assignee: In-Tra-Tec GmbH, Remscheid (DE)

( * ) Notice: Subject to any disclaimer, the term of this patent is extended or adjusted under 35 U.S.C. 154(b) by 266 days.

(21) Appl. No.: 14/622,874

(22) Filed: Feb. 15, 2015

(65) Prior Publication Data

US 2015/0231002 A1    Aug. 20, 2015

(30) Foreign Application Priority Data

Feb. 17, 2014   (DE) .................. 10 2014 001 984

(51) Int. Cl.
*A61G 5/10*   (2006.01)
*A61G 5/04*   (2013.01)

(52) U.S. Cl.
CPC ............. *A61G 5/1059* (2013.01); *A61G 5/04* (2013.01); *A61G 5/1075* (2013.01)

(58) Field of Classification Search
CPC ....... A61G 5/1059; A61G 5/1075; A61G 5/04
USPC ...................................... 297/344.16, 344.17
See application file for complete search history.

(56) References Cited

U.S. PATENT DOCUMENTS

| 3,123,400 | A | * | 3/1964 | Paulson | A61G 7/1003 |
|---|---|---|---|---|---|
| | | | | | 297/344.16 X |
| 5,695,248 | A | * | 12/1997 | Bell | A47C 3/30 |
| | | | | | 297/344.17 X |
| 2002/0149168 | A1 | * | 10/2002 | Brown | A61G 5/1059 |
| | | | | | 280/250.1 |
| 2007/0084648 | A1 | * | 4/2007 | DuFresne | A61G 5/1059 |
| | | | | | 180/65.1 |

FOREIGN PATENT DOCUMENTS

JP           06284939 A  * 10/1994

* cited by examiner

*Primary Examiner* — Anthony D Barfield
(74) *Attorney, Agent, or Firm* — Michael Soderman

(57) ABSTRACT

The invention relates to an adjustment device for vehicle seats, in particular for power driven wheelchairs or rehabilitation vehicles, comprising at least one mounting plate and one bearing plate with a lifting device. In order to allow for an individual adjustment of the seat, the lifting device consists of two to four scissor fittings, which are adjustable in height by driving means. Depending on the height setting of each scissor fitting, a lateral inclination or a tilting forwards or backwards can be achieved in addition to the lifting and lowering.

14 Claims, 26 Drawing Sheets

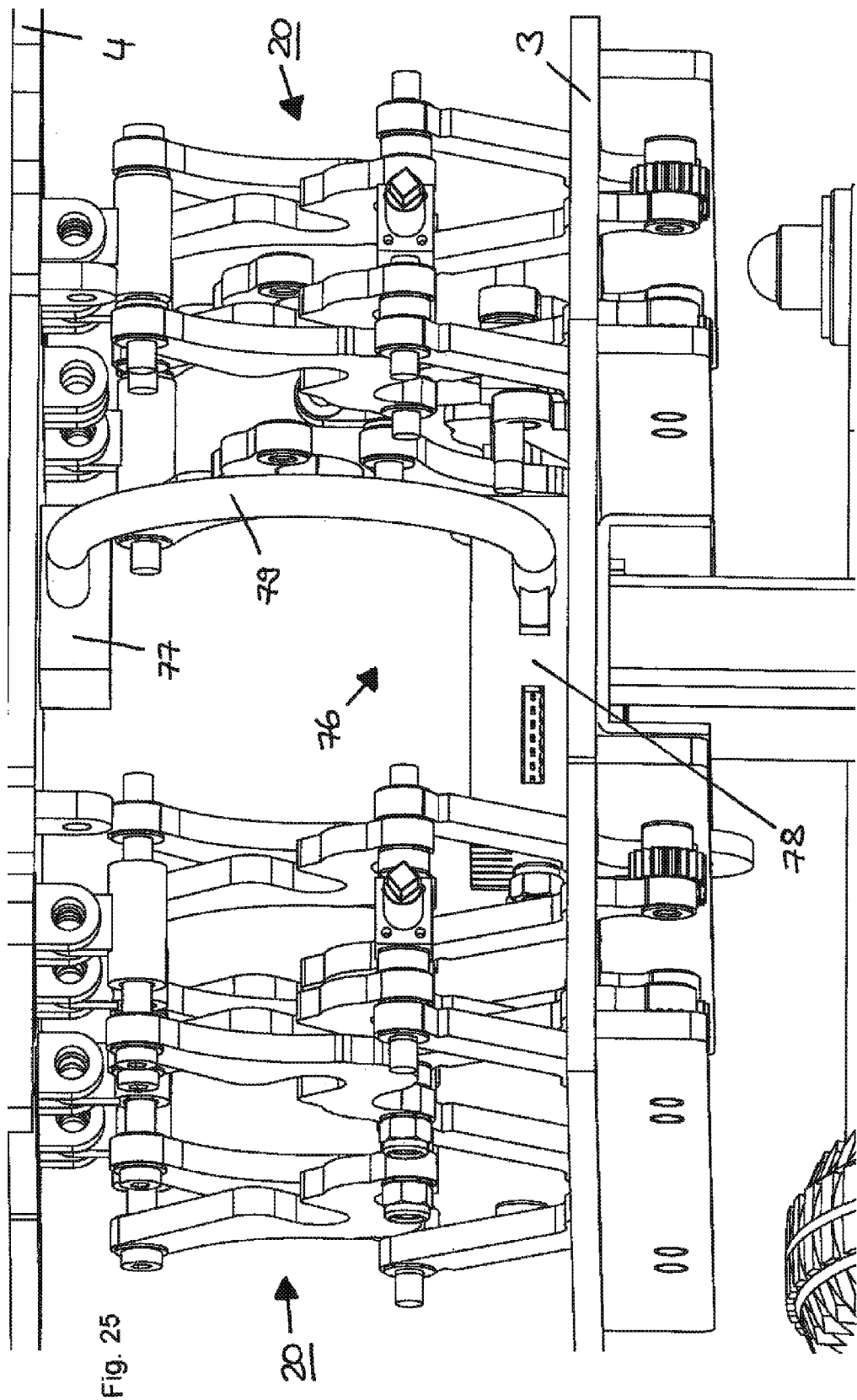

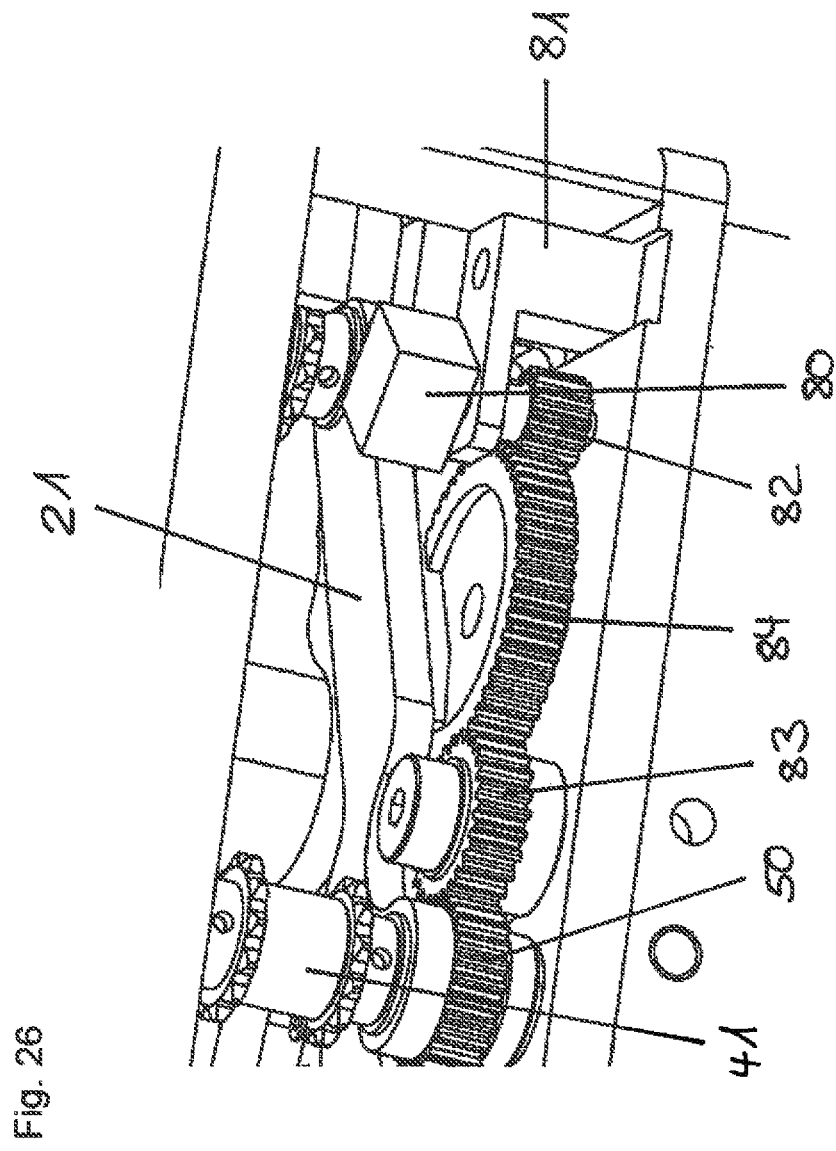

ADJUSTMENT DEVICE FOR VEHICLE SEATS

CROSS-REFERENCE TO RELATED APPLICATIONS

This application claims the benefit under 35 USC 119 of German Application No. DE 10 2014 001 984.5 filed on Feb. 17, 2014; that application is incorporated by reference herein in its entirety.

BACKGROUND

The invention relates to an adjustment device for vehicle seats, in particular for power driven wheelchairs or rehabilitation vehicles, comprising at least one mounting plate and one bearing plate with a lifting device, which comprises at least one scissor fitting.

Vehicles of different types, models and constructions are known for passenger transportation, as construction machines and for agricultural purposes. In addition, there are power driven wheelchairs or rehabilitation vehicles, which are sometimes intended for the reception of considerable weights. Insofar as e.g. construction vehicles or agricultural vehicles, such as tractors, are used in mountainous parts, they feature seat equipment that allows for a horizontal position by means of pneumatic adjusting cylinders. This provision eases the work.

With power driven wheelchairs or other vehicles used for the transport of people with special needs, on an individual basis, it is possible that an adjustment of the seat becomes necessary even on flat routes. This may be the case with physical anomalies or conditions that require a tilting of the seat or the adjustment of a particular angle of inclination for the necessary relief or work to be done. Typical conditions with a particular threat of decubitus ulcers, e.g., are spinal cord injuries, such as quadriplegia, ALS (amyotrophic lateral sclerosis), MS (multiple sclerosis), myopathies, neurologic conditions and craniocerebral injuries. By means of an adjustment device for these people relief can be at least partially be achieved.

An adjustment device intended for a power driven wheelchair has to fulfill certain requirements. On the one hand, the overall height must not exceed a certain measurement, since a barrier-free access, e.g. to the vehicle, is no longer guaranteed, and on the other hand, power driven wheelchairs must not exceed a certain height, since often tables are needed for working or for private business, people need to be able to place their wheelchairs in front of or under said table. Therefore, there is an requirement, that power driven wheelchairs or rehabilitation vehicles can take different positions as well as fulfilling the previously mentioned basic conditions.

SUMMARY

The invention relates to an adjustment device 2 for vehicle seats, in particular for power driven wheelchairs or rehabilitation vehicles, comprising at least one mounting plate 3 and one bearing plate 4 with a lifting device 5. In order to allow for an individual adjustment of the seat, the lifting device 5 consists of two to four scissor fittings 20, which are adjustable in height by driving means. Depending on the height setting of each scissor fitting 20, a lateral inclination or a tilting forwards or backwards can be achieved in addition to the lifting and lowering.

DETAILED DESCRIPTION

The invention at hand is based on the task to show a new adjustment device with a lifting device for vehicles, which is constructed to be particularly space saving while guaranteeing an individual adjustability.

In order to solve the task, it is intended that the lifting device features at least two scissor fittings, which are arranged at the longitudinal edge or in a corner region of the respective mounting or bearing plate and which are adjustable in height by driving means. Further advantageous embodiments result from the sub-claims.

Starting with a bearing plate, which is, e.g., connected to the understructure of the power driven wheelchair, and a mounting plate, which is basically intended for the mounting of the seat, an adjustment device is suggested, which is arranged between the mounting plate and the bearing plate, and which offers the possibility of an individual height adjustment.

It is suggested to equip the lifting device with two, three or four scissor fittings. Two scissor fittings are fixed at the longitudinal edge of the mounting plate or bearing plate, so that the supporting plate can be variably adjusted in height due to simultaneous loading of both scissor fittings. Insofar as only one scissor fitting is loaded, a sideway tilting to the left or the right may occur. Alternatively, when applying four scissor fittings, these may be arranged in the corner regions of the mounting and bearing plates, so that further possibilities for adjustment of the supporting plate occur. When the scissor fittings in the back of the mounting plate are risen, the supporting plate is tilted to the front. When the scissor fittings in the front are lifted, a tilting to the back occurs. Additionally, there is the possibility to lift both scissor fittings on the left or right side, resulting in a tilt to the right or left respectively. Furthermore, it is possible to set a tilt on the diagonal axis of the supporting plate. For this it is necessary to have, e.g. the front right scissor fitting remain in its lower position, while the back left scissor fitting is raised almost completely and the remaining scissor fittings back right and front left are only partially lifted. Alternatively, a tilting on the second diagonal axis can occur in a similar way. Insofar as only an adjustment in height is desired, all scissor fittings are lifted in approximately the same height. The previous adjustments can also be achieved with three scissor fittings.

In order to provide for a tilt adjustment of the seat, medical aspects are decisive as well. Typical conditions are muscular dystrophy, CP (cerebral palsy), or spina bifida. The spine and the ischia are relieved from pressure with a lateral inclination of 20° when a person is suffering from scoliosis (s-shaped side bend of the spine). The seat has to be tilted to the side according to the person's needs, until the pectoral girdle is leveled out. Thus, a natural posture of the head and perception become possible. The person concerned can usually decide the period of displacement on their own, and are thus able to systematically take their pressure off themselves. With a 40° back tilt, a pressure relieve of the ischia, which are prone to decubitus ulcers, occurs with a 70 to 80% chance (decubitus prophylaxis), and is therefore often called medical positioning. Eye contact is only possible to a certain degree in this position. During its use one a wheelchair, the additional tilting of the seat to the front also allows for a compensation of the center of gravity, which prevents a tilting danger to the back due to back tilting. With a back tilt of 20° to 30°, a pleasant resting or relaxation position is possible for the person concerned. With a 20° to 25° back tilt and a 15° to 20° side tilt (diagonal tilting), a relieve from pressure of up to 90% for the right or left ischium occurs (decubitus prophylaxis). Eye contact with the immediate surroundings of the seat is also completely unrestricted.

Patients with the typical syndromes of a significant threat of decubitus ulcers due to spinal cord injuries, such as ALS, MS, myopathies, neurological deficits and apoplexy can be helped this way.

With the integrative indication, e.g., it is achieved that with a 20 cm rise of the seat, an easy reach of higher stored items and simply eye contact become possible. With a 20 cm rise of the seat and a simultaneous or subsequent tilting to the front of 40°, the active act of standing up is supported for people with limited mobility or reduced muscular strength. When using on a wheelchair, the additional displacement of the seat to the front allows for a free standing area without limitation due to the front wheels of the chair.

With a 20° side tilt with a variable rise, it is possible to achieve a simple side sliding transfer, e.g. to toilets, beds, chairs or nursing benches. Additionally, the sliding can be supported with a transfer board. An independent or mere lightly supported transfer is crucial for the self-determined day to day life of people who are bound to a power driven wheelchair due to significant limited mobility.

The adjustment device according to the invention allows for a plurality of positioning settings of the bearing plate, which are equivalent to the seat tilt. Thus, the desired position, which a disabled person requires for a painless seated position for work, e.g., can be sets in an advantageous way. When tilting the bearing plate to the front, e.g., standing up is eased, while a tilting back may allow for a rest position. Due to the possible adjustment of height of the bearing plate and the seat, an adaption to present table heights can occur any time, so that the person may park the front side of the vehicle under the table. The particular advantage of the adjustment devise is that, due to the use of scissor fittings, the complete embodiment is particularly compact in its height, and therefore allows for retrofitting of available vehicles. The structural height does not exceed a height of 12 cm, and can therefore be uncomplicatedly integrated both into an available vehicle or a new vehicle. When a mounting plate is used in a lower box-shaped underbody, the transmission components of the adjustment device can be integrated into the box-shaped underbody and thus reduce the structural height to 8 cm. The tilt settings of the bearing plate are advantageously supported, so that the scissor fittings can be adjusted in height independent from each other.

In a further embodiment of the invention it is intended, that each scissor fitting consists of double scissors, so that a sufficient stability of the bearing plate is achieved and furthermore a high load is guaranteed. The scissor elements of a scissor fitting are such arranged in offset levels that there is no contact. Therefore, a deadlock is impossible, and an independent adjustment of height is ensured. In this case, each scissor fitting consists of four scissor elements which are arranged in pairs with a respective first lower and a second upper scissor element. The upper and lower scissor elements with conspiring tilts are connected in a common hinge point with a rotation axle. The suppleness of the scissor elements is ensured through the rotation axle, so that the upper and lower scissor elements can be deviated against the plane of the rotation axle. In this case, the length of the individual scissor elements determines the maximal rise. Depending on the number of scissor elements used, the length of the individual scissor elements is to be matched, or their distance is to be increased, since there is otherwise the danger of a deadlock of the individual scissor elements.

Alternatively, the scissor elements can be set off to one side. With two scissor fittings at the longitudinal edges of the mounting plate, the amount of space available is sufficient. However, if four scissor fittings are employed, the lengths of the individual scissor elements are to be chosen such that the scissor fittings do not touch each other when the scissor fittings are in the retracted position. Owing to the scissor elements arranged in pairs, which are mounted in a rotationally fixed manner, both a lifting of the mounting plate and a tilting are possible. When lifted, the central rotation axles of each scissor fitting remain in a horizontal position, while the rotation axles move closer to each other when the scissor fittings are raised, and move away from each other when the scissor fittings are lowered. When a tilting is set, the lifted axles of the engaged scissor fittings also remain in a horizontal position, while it is simultaneously ensured that those scissor fittings not engaged allow for a pivoting due to the upper scissor elements.

In order to install the scissor fittings, it is intended in a further embodiment that each scissor fitting features a first lower scissor element, which is connected in a first pivot point with a console of the mounting plate or a box-shaped underbody and in a second pivot point with a rotation axle, while the second scissor element is connected in a first pivot point with the bearing plate and in a second pivot point with the rotation axle of the first scissor element. With this embodiment the free ends of a scissor fitting are each connected to the mounting plate or, respectively, with the bearing plate in a pivot point. The rotation axles arranged in the central area are intended for the storage of each of two lower and two upper scissor elements, so that these share a common pivot point and are able to perform simultaneous movements due to the threaded spindle.

In this embodiment of the invention it is intended, that the rotation axles of a scissor fitting feature a spindle bracket, into which a threaded spindle is screwed in, while the threated spindle features a right-handed thread at the one end and a left-handed threat at the other end. When the threaded spindle is turned, the scissor elements of a scissor fitting are moved towards each other or away from each other in the central area. Thus, the height adjustment of the scissor fitting is achieved, since the free ends of the scissor elements are connected to the bearing plate or, respectively, to the mounting plate, and are deviated. Regarding the adjustment of height, it is intended, that the threated spindle can be driven by driving means, which is an electric, hydraulic or pneumatic motor, e.g., which directly drives the threaded spindle, or which drives the threaded spindle indirectly through a toothed belt or a flexible shaft. When motors drive the spindle directly, they are arranged in the axial direction of the spindle, while with a side arrangement of the motors the turning of the spindle is achieved with the help of a toothed belt or a motor gear sprocket and a sprocket on the spindle. The sprockets used are led non-rotatably in a notch, so that the position of the sprockets in comparison to the driving means is kept, but the spindle is displaced within the sprocket due to the rotation. With this embodiment, the gap between the scissor fittings can be used for storing the motors, and there is no axial extension of the spindle ends, which could be obstructive in this case. Each pair of double scissor fittings features a threaded spindle, so that each threaded spindle is provided with its own driving motor, in order to ensure the independence of the individual scissor fittings. Due to the use of a flexible shaft arises the opportunity to arrange the driving motor between the scissor fittings below the bearing plate, while the flexible shaft transfers the torsional moment directly or through a gear reduction to the threaded spindle.

Preferably, the driving means is an electric motor, which is mounted directly above a corresponding toothing with a gear on the end of the threaded spindle. The driving means in the form of an electric motor is arranged pivotably connected by a carriage guide in order to be able to follow the height movement of the threaded spindle when the scissor fittings are raised. The carriage guide may consist of a trazoidal rail, e.g., which is directly bolted to the mounting plate. On the trazoidal rail a slide shoe is arranged, onto which the electric motor is pivotably connected. Thus, the gear, which is suspended on the corresponding toothing of the threaded spindle, and the slide shoe support the electric motor. This direct drive offers the advantage that the motor keeps its position in relation to the threaded spindle. The motor does not have to glide onto the spindle over splines, as is the case with a belt drive. Furthermore, the compact design can be arranged on the face side of the mounting plate. Alternatively, the connection through a flexible shaft can be considered, so that the electric motor can be arranged freely, e.g. in parallel to the threaded spindle. In this case, the motor can be fixed; the flexible shaft then compensates the movement of the threaded spindle.

In this case, the intended mounting plate is connected with an underbody of a vehicle, while the bearing plate is intended to form the seat or to have a seat with or without a back rest fixed to it. The scissor fittings are found between the mounting plate and the bearing plate.

In a particular embodiment of the invention it is intended, that the first pivot point of the second upper scissor element consists of a rotating sliding sleeve, which is arranged on a rotation axle and is connected with the bearing plate, which connects the two upper pivot points of the adjoining scissor elements, whereat at least one sleeve of a scissor fitting is additionally mounted relocatably on the rotation axle.

The upper pivot points of the rotation axle are used to receive a sleeve, which is pivotable and relocatable, while the sleeve is connected to a console of the mounting plate through a radial extension. The console allows for the pivoting of the extension, so that the sleeve is moveable depending on the position of the scissor fitting between the two pivoting points, which are virtually forming a locating surface. Thanks to the sleeve it is ensured that during the tilting of the bearing plate, e.g. during a sideway tilting to the left or right, no tension occurs within the scissor fittings, and therefore a deadlock is prevented. In this case, it is sufficient to provide the scissor fittings on the left or the right side with an axially moveable sleeve at the longitudinal edge, while the opposite fittings feature a sleeve that is not pivotable on the rotation axle. Thus, a diagonal displacement towards the scissor fittings can be evened out for any side tilt, and the weight resting on the bearing plate is kept stable and safe. Due to the fact, that the respective opposite scissor fittings along an longitudinal edge do not feature an axially moveable sleeve, an accidental dislocation of the bearing plate is avoided.

In a further embodiment of the invention it is intended, that the first pivot point of the first scissor element is connected to a rotation axle in pairs and in a non-rotating manner, which is stored in a lower frame part, while toothing elements, such as drive pinion gears, couple two adjoining rotation axles of two respective lower scissor elements. The toothing elements serve for the synchronization of the two rotation axles, which are counter-rotating. Each rotating axle is connected with two lower scissor elements, namely, with one scissor element moveable to the right and one moveable to the left, so that said scissor elements can be deviated to the left and right side when the threaded spindle is operated, or that with a reversed direction of rotation of the threaded spindle, the scissor elements can be brought into a raised position. The toothing allows for a coupling of the lower scissor elements, which prevents a panning to the front or back of the two scissor elements, and thus allows for a stable, fixed erection of the bearing plate.

A particular advantage of the embodiment of the adjustment device according to the invention is the low construction height due to the used scissor elements of a scissor fitting, which are arranged next to each other, so that a construction height of 12 cm is not exceeded, while a part of the adjustment device can be integrated in the box-shaped underbody or in the frame of the vehicle or power driven wheelchair.

In a further advantageous embodiment of the invention it is intended that the mounting plate is connected to at least one feed rail, and said feed rail is mounted in a linear drive unit, whereat the linear drive unit is tightly connected with the vehicle underbody, and whereat the feed rail is moveable through a toothed rack, a belt, a spindle, or a linear motor with respect to the vehicle underbody. The feed rail allows for a displacement of the mounting plates from the vehicle underbody. This way, the seating position can be adjusted compared to the wheel position. By the use of the feed rail it is possible that the bearing plate with an attached seat and a person sitting in said seat is relocated, which results in the maximum stability against overturning. In this case is it of particular importance to consider the movement of the center of gravity when tilting the bearing plate to the front or back. Further, the use of a feed rail allows for a person to sit up more easily, by relocating the seat attached to the bearing plate to the front, and therefore allowing the feet to touch the ground in a position free from obstruction, such as the front wheels.

In order to limit the movement of the scissor elements, the basic embodiment intends for at least one end switch, which is activated every time the scissor elements are to be relocated to the upper or lower positions, so that the driving motor is turned off in one direction of rotation. The movement of the lower scissor elements is exactly ascertainable through a toothing element and an angle transmitter. The toothing element cogs a toothed part of the first pivot point, so that the angle transmitter notices a rotation, and the height of the individual scissor elements can be determined according to the rotation. By considering the upper and lower limits, it is therefore possible to ascertain the individual height of each scissor element through the control unit, and to correct it insofar as necessary. Alternatively, it is possible to monitor the movement of the lower scissor elements and, consequently, the movement of the upper scissor elements by means of a speed sensor through the rotation of the threaded spindle due to its coupling. Said speed sensor can either be arranged on one side of the threaded spindle, or it can be mounted to the driving motor, so that a counting of the rotations and a measure of an angle become possible. A precise determination of the position in height is possible, thanks to the individual rotations and the value of the angle, so that in this particular case corrections can be made through the control unit. Possible speed sensors are both incremental and decremental encoders.

In a further embodiment of the invention it is intended that the mounting plate features at least one rubber buffer, preferably four rubber buffers, onto which the bearing plate rests in the lower position. The bearing plate, which is displaceable in height, and its possible superstructures, such as a seat, are secured in the different positions by the scissor elements. In the lowest position, it is possible to even out a potential margin by lowering the bearing plate as far as necessary to have the bearing plate rest on the rubber buffers. This allows for a fastening of the mounting plate and the bearing plate, so that a sufficient fixation in the lower position becomes possible. Furthermore, when raising the bearing plate, it is guaranteed that it can be raised steadily from the lower positions, while the rubber buffers create a supporting upwards pressure for lifting.

In a particular embodiment of the invention it is intended that the mounting plate and the bearing plate are each equipped with a gyro sensor, which is coupled with a control unit of the driving means. Gyro sensors are used to determine an accurate horizontal position, whereat both the position of the mounting plate, which is connected to the vehicle underbody, and the position of the bearing plate, which carries the seat, offer the possibility to maintain a set angle of the bearing plate, e.g. when driving on an uneven terrain, by re-adjusting the scissor elements. By means of the gyro sensors and the control unit, it can therefore be achieved to have the bearing plate remain in the same tilting on an uneven terrain, and to keep the same set and desired seat position. The signals of the two gyro sensors are therefore used to determine a position of the bearing plate in comparison to the mounting plate, and to keep the set tilt position when driving the wheelchair. That means that even if the terrain is uneven, the bearing plate and the seat are automatically adjusted.

The particular advantage of the invention at hand is that with the aid of at least two scissor fittings an individual setting of the bearing plate for a seat becomes possible. Each individual scissor fitting with a total of four lower and four upper scissor elements is of exceptionally high stability, so that even heavy loads, e.g. heavyweight persons, can be moved in height. Furthermore, it is possible to achieve individual settings of tilting of the seat with the aid of four scissor fittings, namely, with a tilting of the seat to the front or back or, respectively, to the left or right side. Additionally, three or four scissor fittings offer the possibility to pursue a diagonal tilting of the bearing plate, which results in a plurality of positions that benefit the respective user of the vehicle.

It is worth to mention the particularly flat construction height, which can be achieved due to the scissor fittings, and which allows for a retrofitting of available vehicles. Owing to a particularly optimized control logic and at least one, preferably several absolute position transducers the position of the seat can be captured, and kept in a desired position when the vehicle is moving on an uneven or sloping terrain, e.g., while the seat position remains in the desired position independently of the terrain through adjustment of the scissor fittings. The means of driving of the scissor fittings automatically even out the roughness of the terrain, in particular with extremely sloping terrains, within their limits.

BRIEF DESCRIPTION OF THE DRAWINGS

The invention is further explained with the aid of the figures.

It shows

DETAILED DESCRIPTION OF THE PREFERRED EMBODIMENTS

Figure 1:
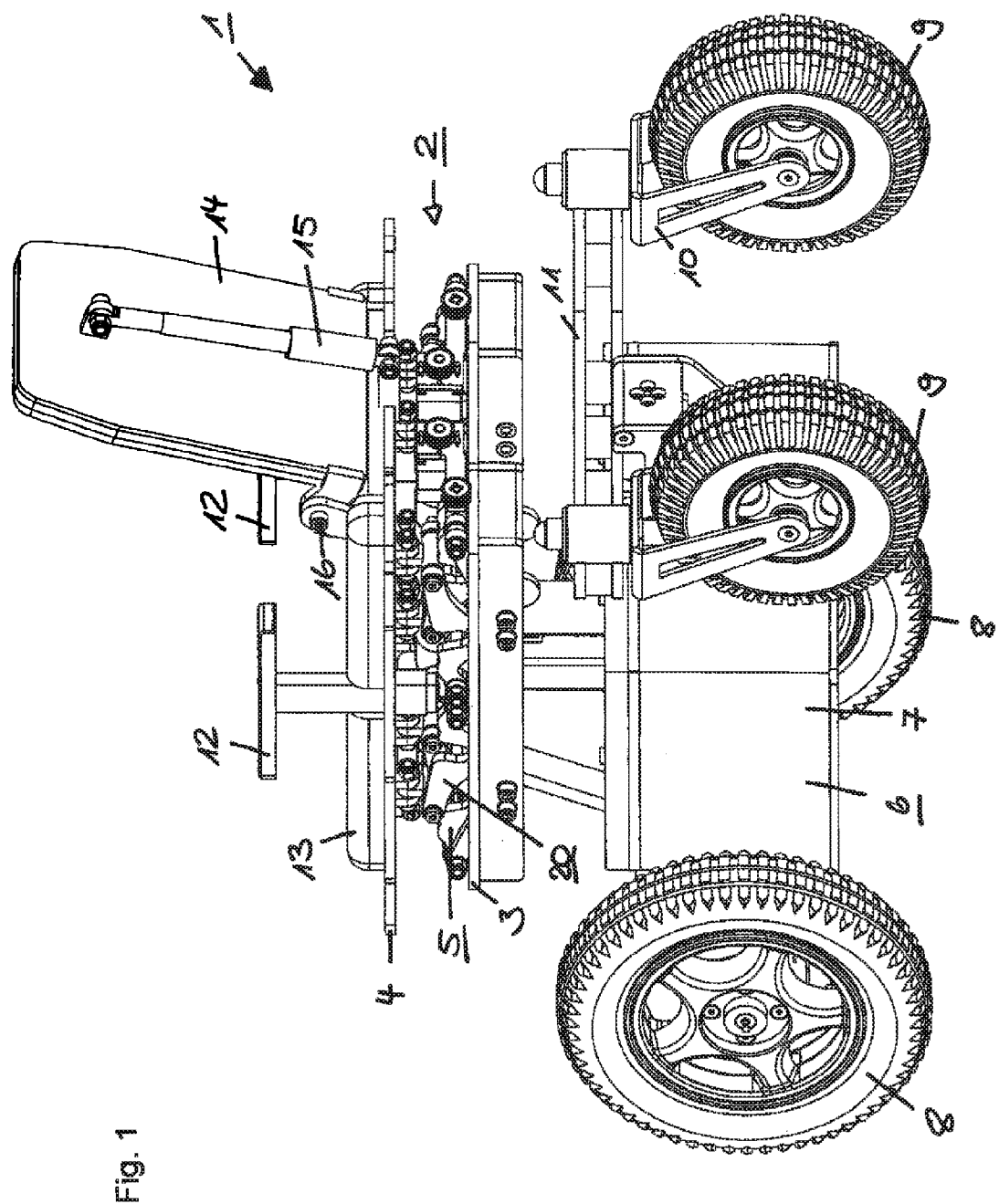
FIG. 1 a vehicle with adjustment device for an available seat in a perspective view, FIG. 2 the vehicle known from FIG. 1 in a side view, FIG. 3 the vehicle according to FIG. 1 with a seat moved to the front in a side view, FIG. 4 the vehicle with a seat tilted back in a perspective view, FIG. 5 the position of the seat according FIG. 4 in a side view, FIG. 6 the vehicle according to FIG. 4 in another side view, whereat the seat is additionally moved to the front, FIG. 7 the vehicle according to FIG. 4 in a front and back view FIG. 8 the vehicle with a seat tilted diagonally to the front left in the vehicle direction in a perspective view, FIG. 9 the vehicle with a tilted seat according to FIG. 8 in a further perspective view, FIG. 10 the vehicle with a seat tilted to the left according to FIG. 8 in a front and back view, FIG. 11 the vehicle with a lifted seat in a perspective view, FIG. 12 the vehicle with lifted seat according to FIG. 11 in a side view, FIG. 13 the lifting device with mounting plate and bearing plate in a side view, FIG. 14 the lifting device in a lifted position of the bearing plate according to FIG. 13, FIG. 15 the lifting device with a tilted bearing plate in a side view, FIG. 16 the adjustment device with a side tilt of about 15° in a perspective bottom view, FIG. 17 the adjustment device with lifting device in a front/back tilt in a further perspective bottom view and the connection between spindle and driving unit in a partial view, FIG. 18 the adjustment device with lifting device with a seat tilt of about 15° in a perspective bottom view, as well as two detailed views of the lower pivot points of the scissor fitting in a box-shaped underbody and the driving means for the threaded spindle with a displacement of the upper bearing plate for a side tilt, FIG. 19 the adjustment device with lifting devise with a seat tilt of about 15° and the driving means for the threaded spindle in a back view, FIG. 20 once more the adjustment device with lifting device in a tilted position with the driving means in a perspective back view FIG. 21 an alternative driving concept for the threated spindle with the aid of a mounted electric motor in a perspective partial view, FIG. 22 the driving concept according to FIG. 21 from another point of view in a perspective partial view, FIG. 23 a further driving concept with the aid of an electric motor and a flexible shaft in a perspective partial view, FIG. 24 the adjustability of the bearing plate with the aid of a linear driving means in a perspective partial view, FIG. 25 the use of two gyro sensors with control unit in a perspective partial view, and FIG. 26 an angle transmitter in a perspective bottom view.

FIG. 1 shows a vehicle 1 with an adjustment device 2 in a perspective view, while the vehicle is a particularly strong embodiment of a power driven wheelchair. The adjustment device 2 consists of a mounting plate 3 and a bearing plate 4, in-between which the lifting device 5 is arranged. Below the mounting plate 3 there is the vehicle underbody 6, which consists in this case of a box-shaped housing 7 holding the electronics and batteries. Two big driving wheels 8 are attached to the housing 7 through a shaft with motors. The driving wheels 8 are not designed to be steerable in this case, but an indirect steering occurs through the two independent motors, which can be powered with different drives. Two further, smaller wheels 9 are arranged in a forked intake 10 with the aid of a rotation axle, while the two wheels 9 are connected with each other through a pendulum axle 11, and the pendulum axle 11 is bolted to the box-shaped housing 7. The vehicle 1 shown is thus steered through the driving wheels 8, whereat the controls necessary may be integrated into the arm rest 12, e.g.

A seat 13 and a back rest 14 are arranged on the bearing plate 4, while the back rest 14 can be adjusted in its tilt through an adjustment device 15. The back rest 14 is mounted pivotally through a pivot point 16. There are arm rests 12 on both sides of the seat 13. The strong embodiment of the vehicle 1 shows, that this kind of vehicle is used for all terrains, and is furthermore suitable for heavy persons. The lifting device 5 is arranged between the mounting plate 3 and the bearing plate 4, which consists of four scissor fittings 20 arranged in the corner regions in the embodiment shown. The construction of the scissor fittings 20 is shown in the following figures.

Figure 2:
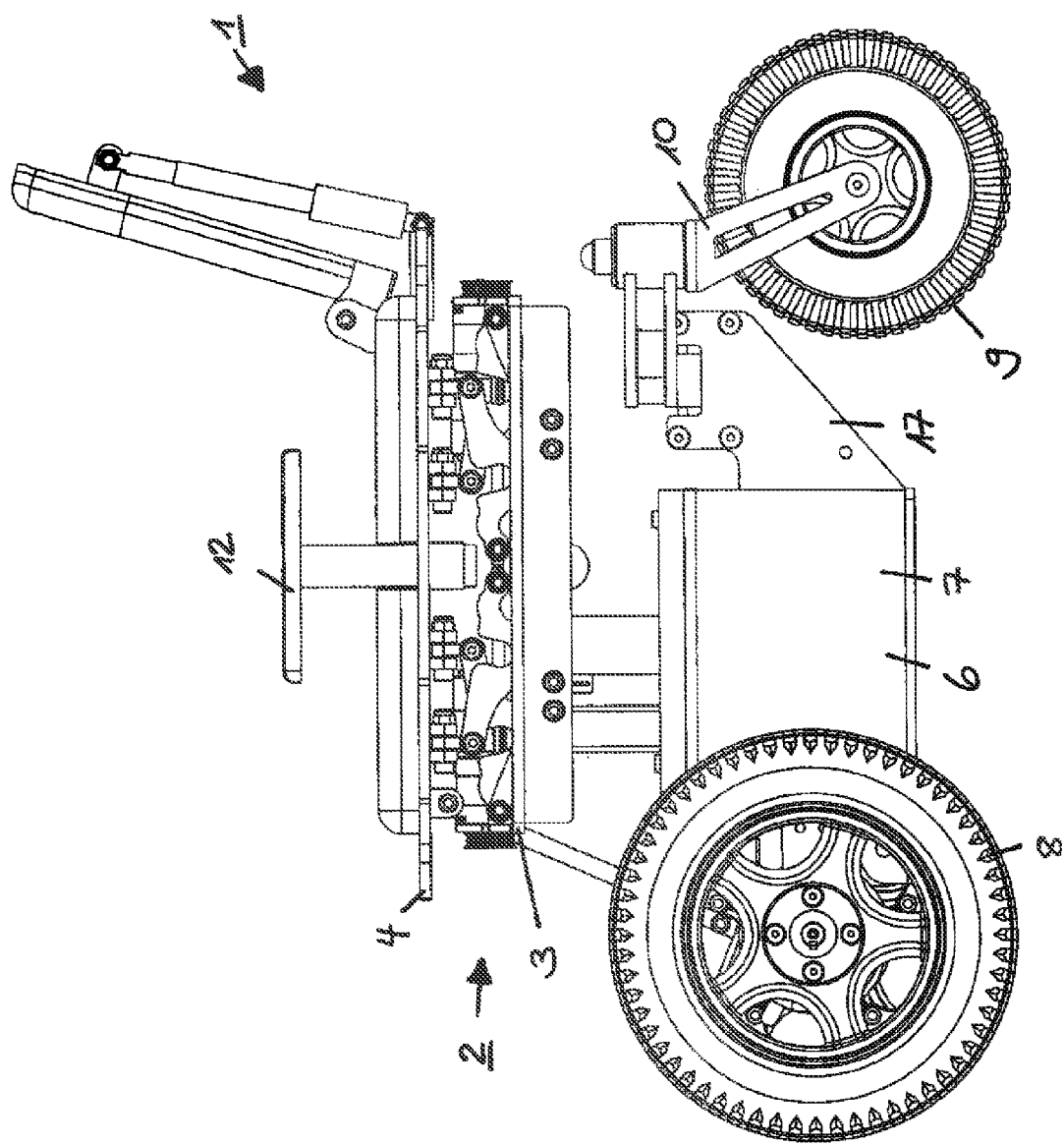

FIG. 2 shows the vehicle known from FIG. 1 with the adjustment device 2 in a side view. The adjustment device 2 is arranged between the mounting plate 3 and the bearing plate 4. This view illustrates, that the driving wheels 8 are each driven by a motor, which is connected to the housing 7. The further, back wheels 9 are attached to a console 17 fixed to the housing 7 through a pendulum axle 11.

Figure 3:
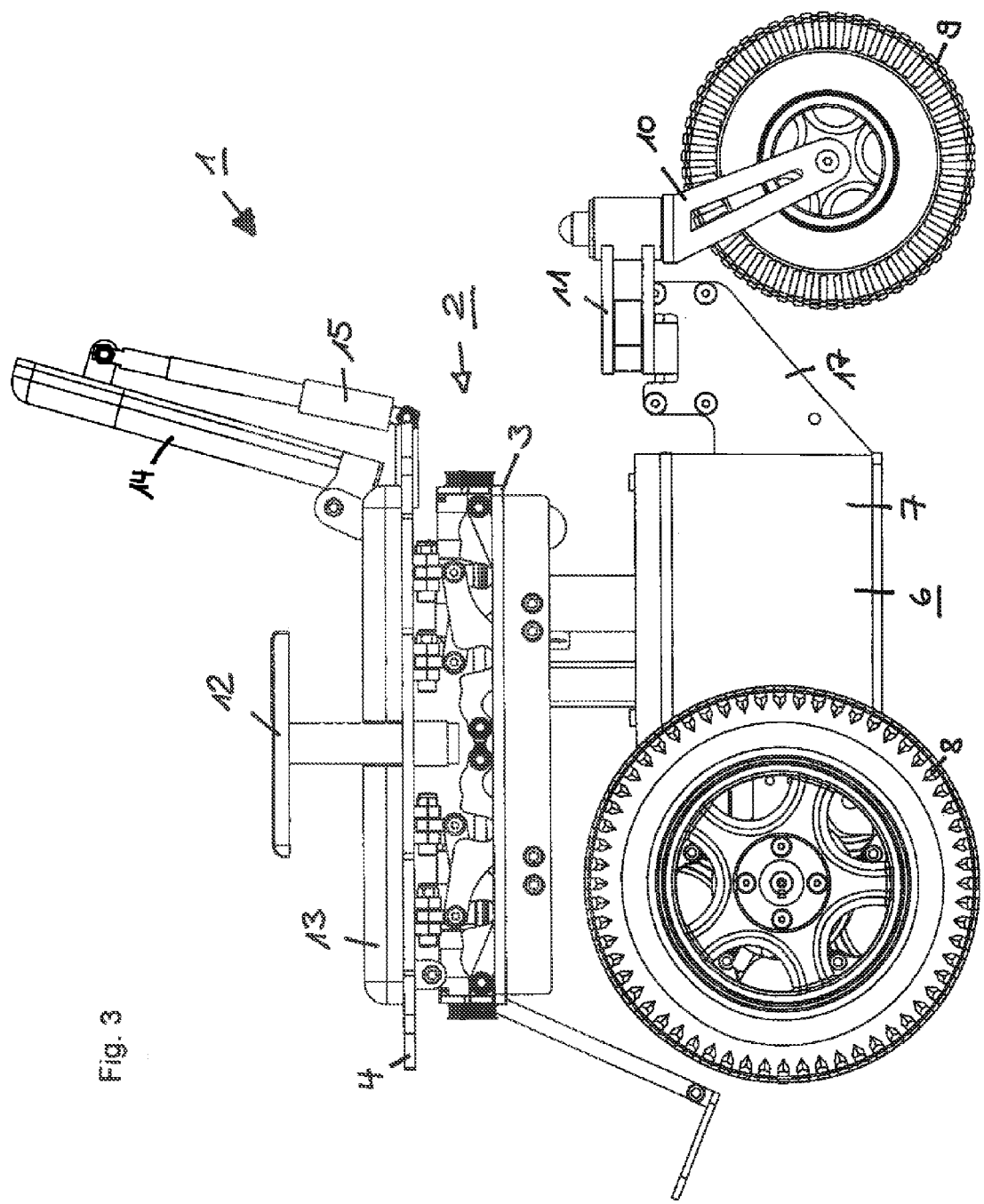

FIG. 3 shows the vehicle 1 according to FIG. 1, whereat, when compared to FIG. 2, the seat 13 with the back rest 14 is additionally moved into the direction of the front driving wheels 8. The setting of the seat position occurs, e.g., through a linear drive, which is arranged below the mounting plate 3.

Figure 4:
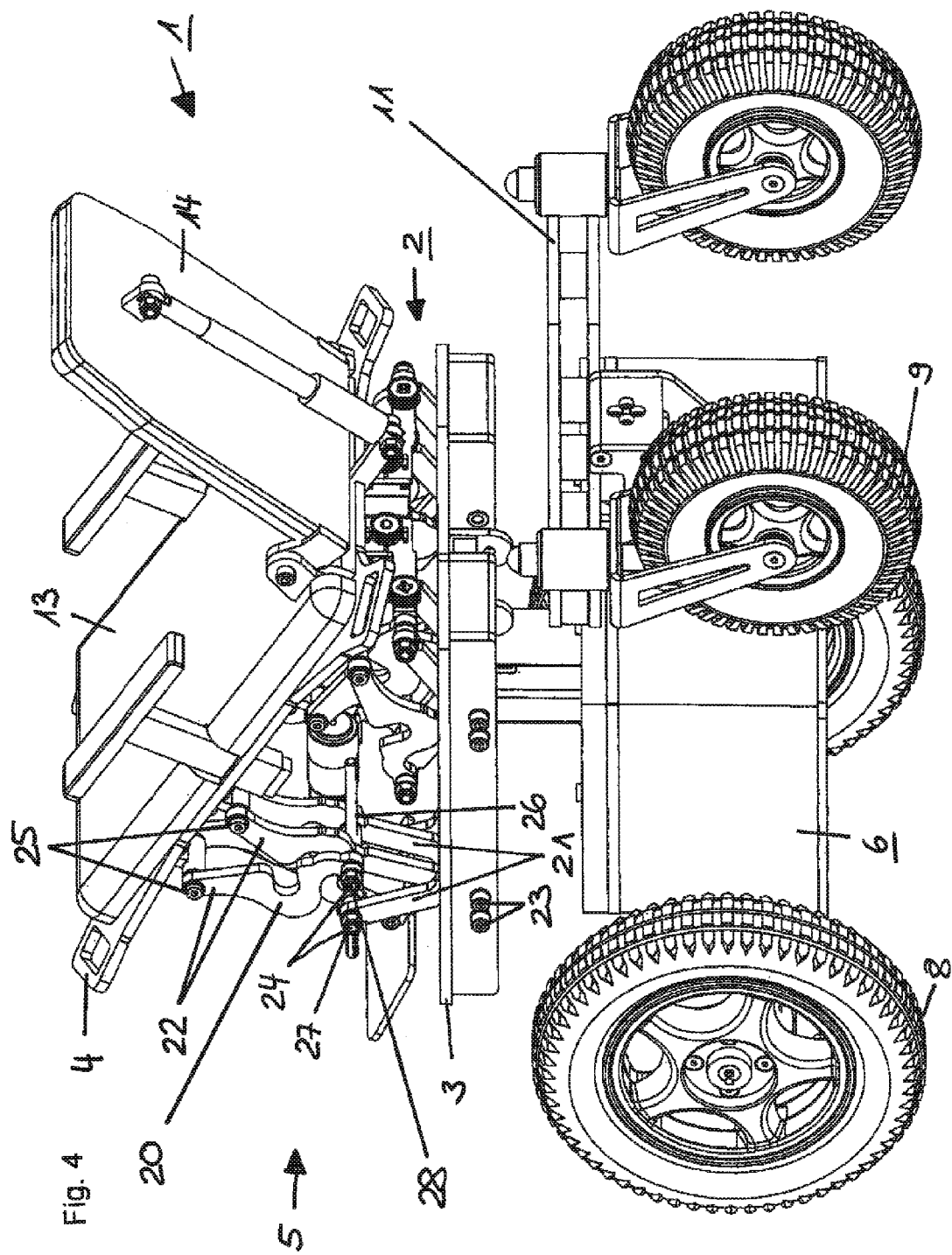

FIG. 4 shows the vehicle 1 according to FIG. 1 with the lower vehicle underbody 6 and the seat 13 with back rest 14 in a perspective back view, whereat the bearing plate 4 is lifted in the front area with the aid of the lifting device 5 when compared to the mounting plate 3. The lifting device 5 consists of a total of four scissor fittings 20, which each consist of four pairs of lower double scissor elements 21 and four pairs of upper double scissor elements 22. Pairs of double scissors has in this case the meaning of two individual scissor elements 21 arranged next to each other and arranged one behind the other. The lower scissor elements 21 are connected to the mounting plate 3 in two lower pivot points 23, and are on the other end connected to the second scissor elements 22 in two pivot points 24. The second scissor elements 22 are connected to the bearing plate 4 in two upper pivot points 25. Pivot point 24 connects the scissor elements 21 and 22 through two rotation axles 27, 28, whereas two respective lower double scissor elements 21 can be rotated to the front and are connected to a rotation axle 27, while two further double scissor elements 21 can be rotated to the back and are connected to a further rotation axle 28. The upper scissor elements 22 are also connected to the pivot point 24 and the first rotation axle 27, so that they can be rotated to the front, while the two further scissor elements 22 can be rotated to the back and are connected with the further rotation axle 28. Both rotation axles 27, 28 feature a spindle bracket in the central area, into which a threaded spindle 26 is screwed. The threated spindle 26 comprises counter-rotating thread sections, a left-handed one and a right-handed one, so that the two rotation axles 27, 28 move towards or away from each other in the pivot point 28 when the threaded spindle 26 is rotated. FIG. 4 illustrates, that the scissor fittings 20 in the front of the vehicle are extended so far, that the seat 13 is raised in the front. The two rotation axles 27, 28 of the pivot point 24 are arranged in a close range, so that the lower scissor elements 21 are in an almost vertical position. The upper scissor elements 22 are slightly tilted back. In contrast to that, the back scissor fittings 20 are shown in their lowest positions, in which the two rotation axles 27, 28 of the scissor fittings 20 are arranged in a wide distance from one another. Due to the seat tilt, which corresponds to the tilt of the bearing plate 4, the upper scissor elements 22 of the lower scissor fittings 20 are rotated and match the position of the bearing plate 4. This position can be found once more in FIG. 5.

Figure 5:
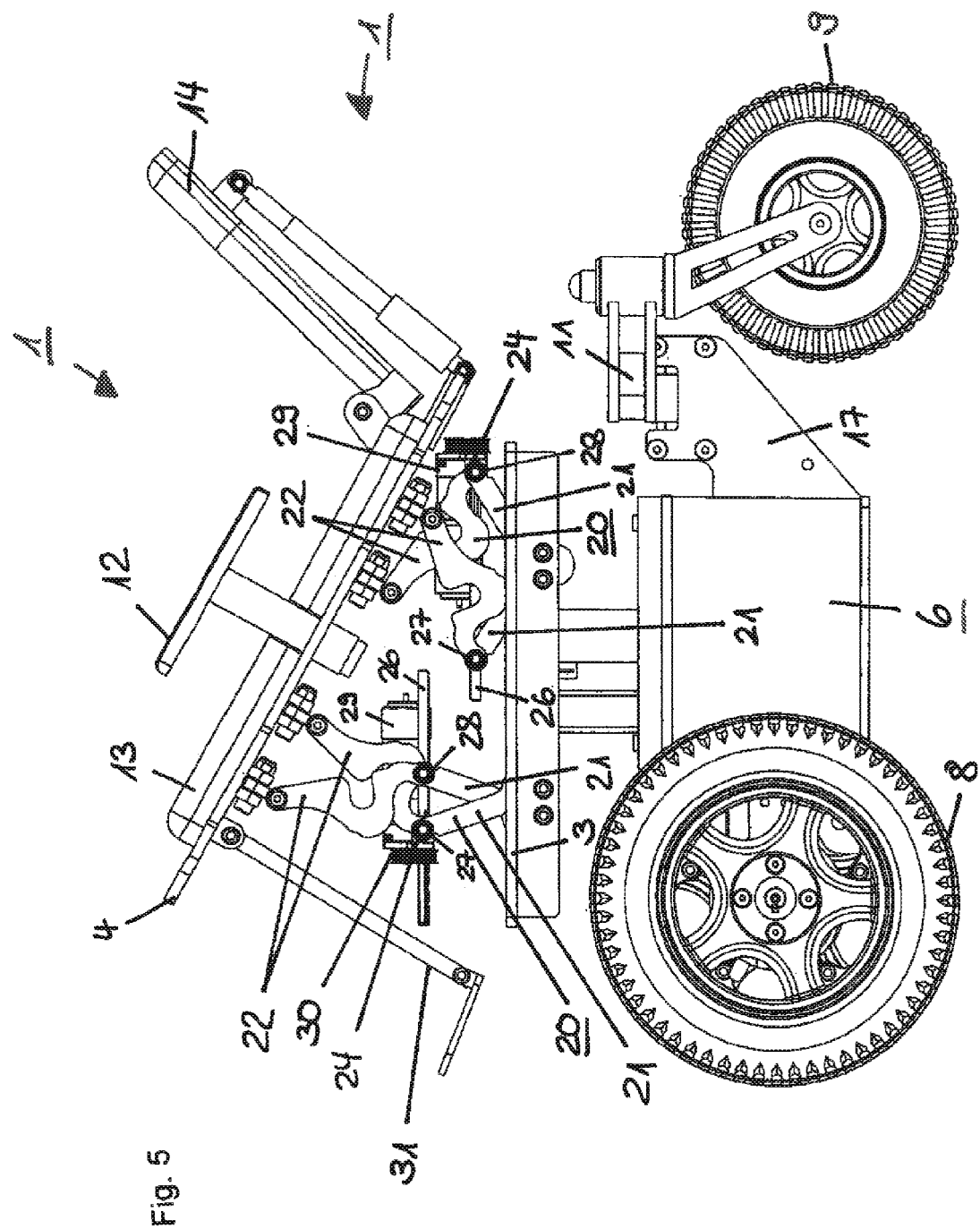

FIG. 5 shows the vehicle 1 according to FIG. 4 with a tilted seat 13 and back rest 14 in a side view. This side view illustrates, that the front scissor fitting 20 with the lower scissor elements 21 and the upper scissor elements 22 has been raised into a high position. The pivot points 24 and their rotation axles 27, 28 are aligned with the threaded spindle 26 and are arranged in close range to each other, while the pivot points 24 of the back scissor fitting 20 with their rotation axles 27, 28 are arranged in a wide distance from each other. The lower scissor elements 21 of these scissor fittings 20 are arranged in a low positions, while, on the other hand, the scissor elements 22 align themselves with the angle defined by the front scissor elements, in order to support the lifting of the seat 13 in the front area. The threaded spindles 26 are moved through a driving motor 29, so that the rotation axles 27, 28 can be either moved towards or away from each other. The transmission of the necessary turning moment from the driving motor 29 happens, e.g., through a toothed belt 30, which is arranged on a pinion of the driving motor 29 and a gear of the threaded spindle. The gear is attached to the end of the threaded spindle 26 to prevent rotation, but can be moved axially.

FIG. 5 further shows that in addition to the seat 13 a foot rest 31 is intended, which is directly bolted to the bearing plate 4. When the seat 13 is lifted, the foot rest 31 is therefore lifted as well.

Figure 6:
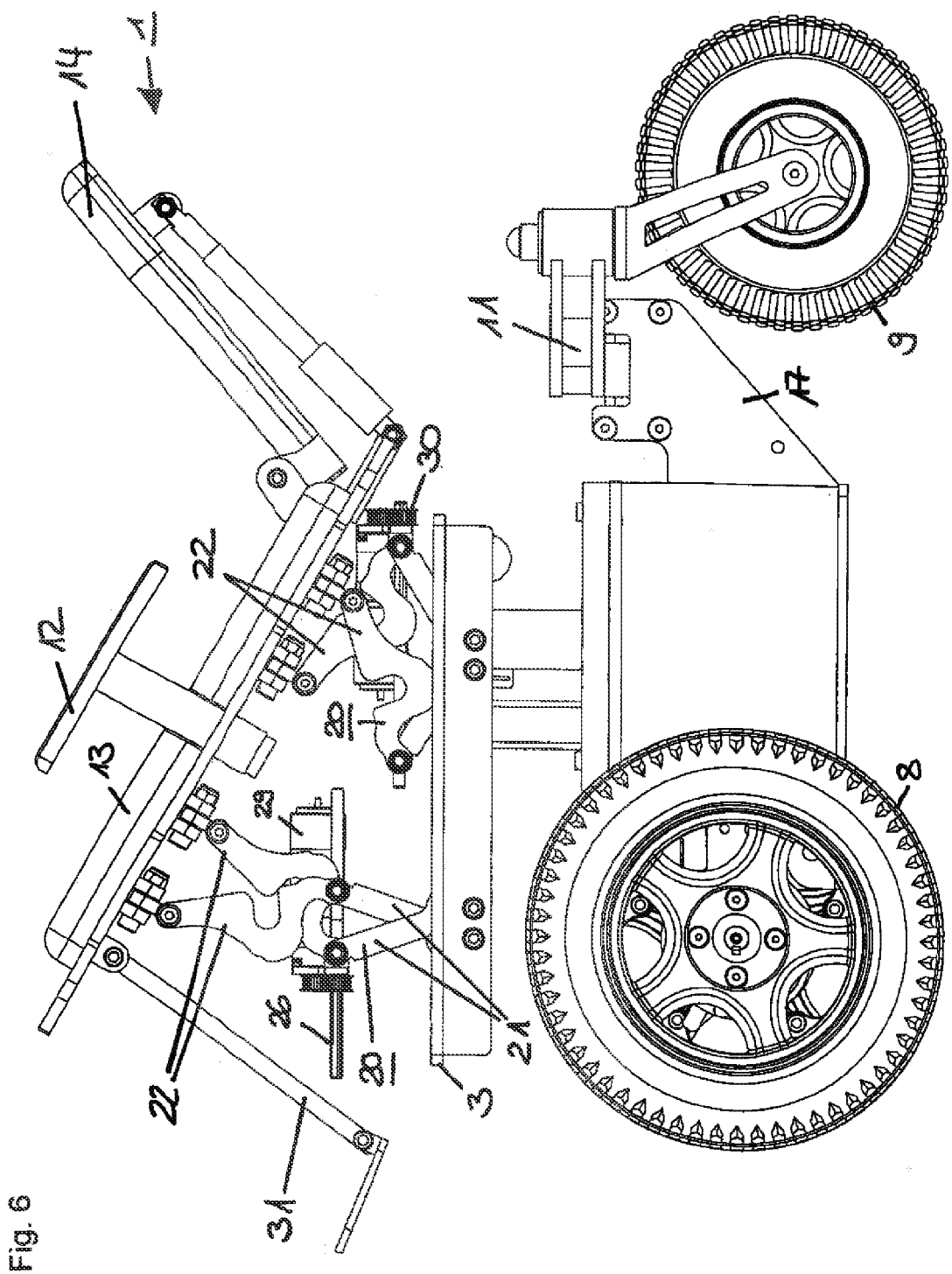

FIG. 6 shows the vehicle 1 according to FIG. 5 in a side view, while the lower mounting plate 3 including its entire superstructure is additionally moved in the direction of the driving wheels 8. This view illustrates the front and back scissor elements 20, which are provided for the lifting of the seat 13 as per the details outlined above.

Figure 7:
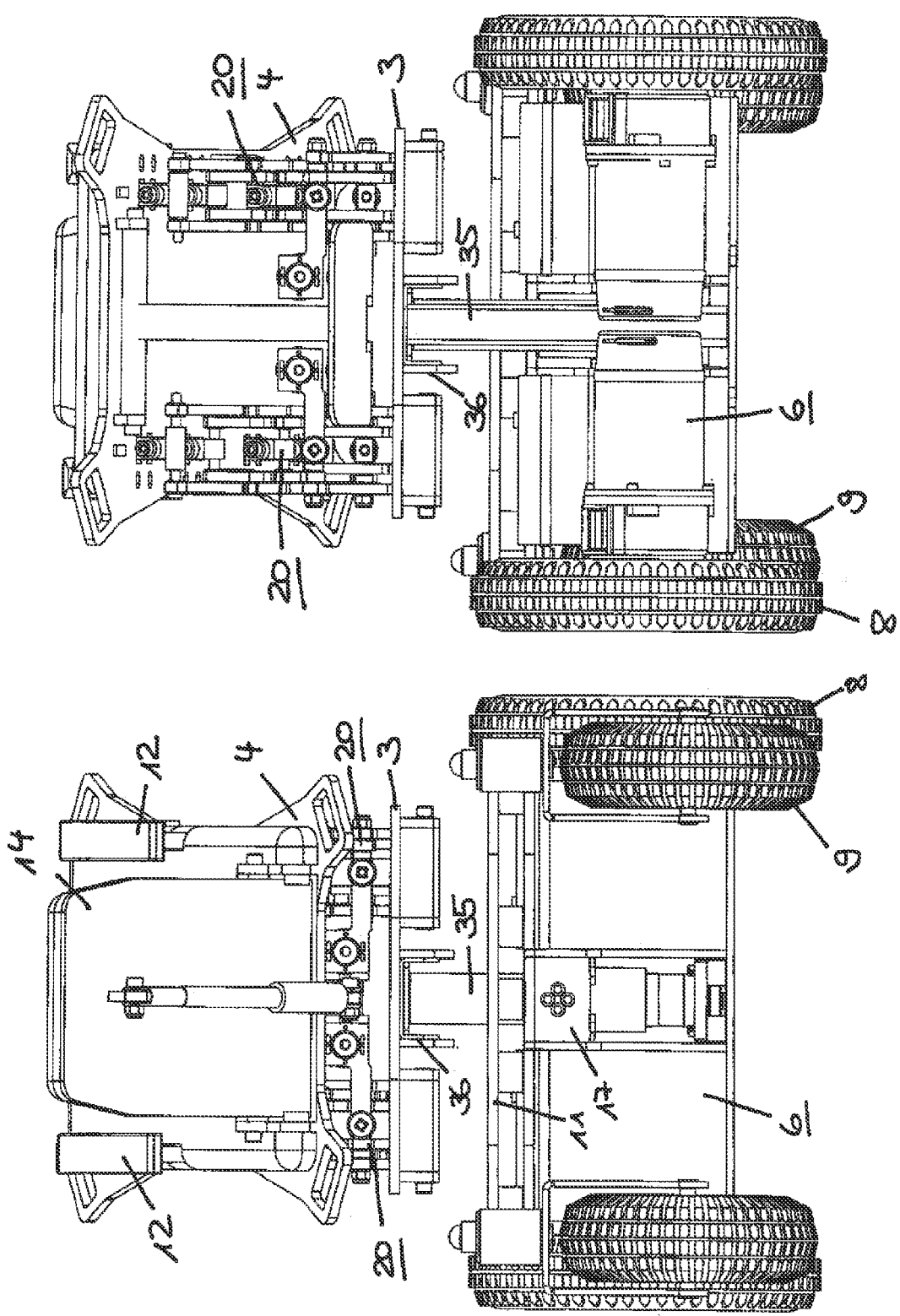

FIG. 7 shows the vehicle 1 according to FIG. 4 in a front and back view with at tilted bearing plate 4. It is apparent in this view, that the vehicle underbody 6 is connected to the mounting plate 3 through a support 35, while said support 35 is inserted in a u-shaped profile 36, which can be part of a linear moveable device to move the seat 13 to the front and the back.

Figure 8:
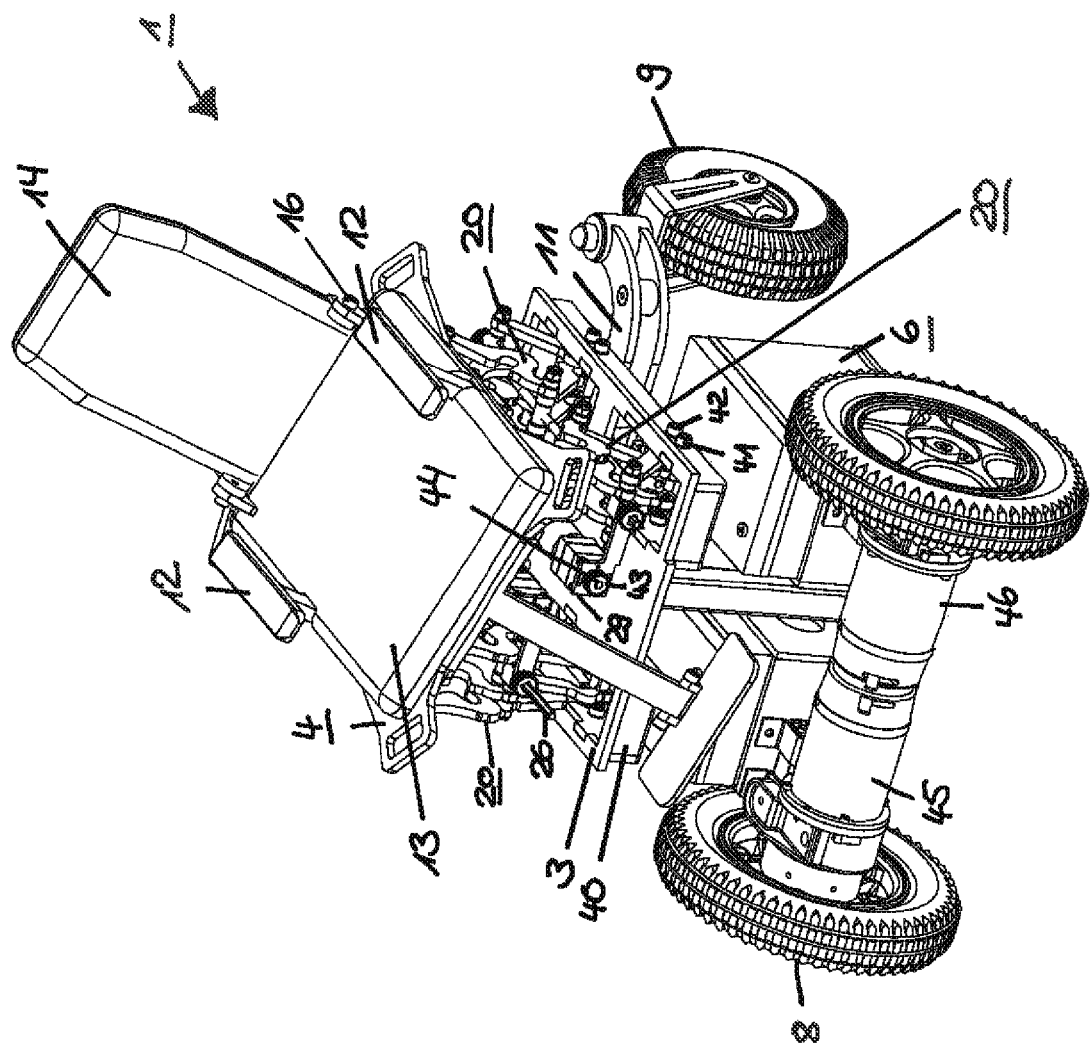

FIG. 8 shows the vehicle 1 with a partly raised and diagonally tilted seat 13 in a perspective view. This view illustrates, that the respective scissor fittings 20 are arranged in the corner regions of the mounting plate 3, while the mounting plate 3 provides respective recesses for the mounting in each corner region. Additional cut-outs are provided in the corners of the mounting plate 3, which can be used for securing the wheelchair with tension belts during transport in a vehicle. The mounting plate 3 is further equipped with a circumferential box-shaped underbody 40, which is also used for the storage of the rotation axles 41, 42 of the lower pivot points 23. The scissor elements 21, 22 are couples as described with the previous figures, while a driving pinion 43 and a sprocket wheel 44 move the threaded spindle 26, e.g., through a belt drive. In this embodiment the belt drive is not shown. As an alternative to a belt drive, a direct toothing could be intended. It is further shown in this view, that the front driving wheels 8 are each supplied with a driving motor 45, 46, which are only used for the traction drive of the vehicle 1.

Figure 9:
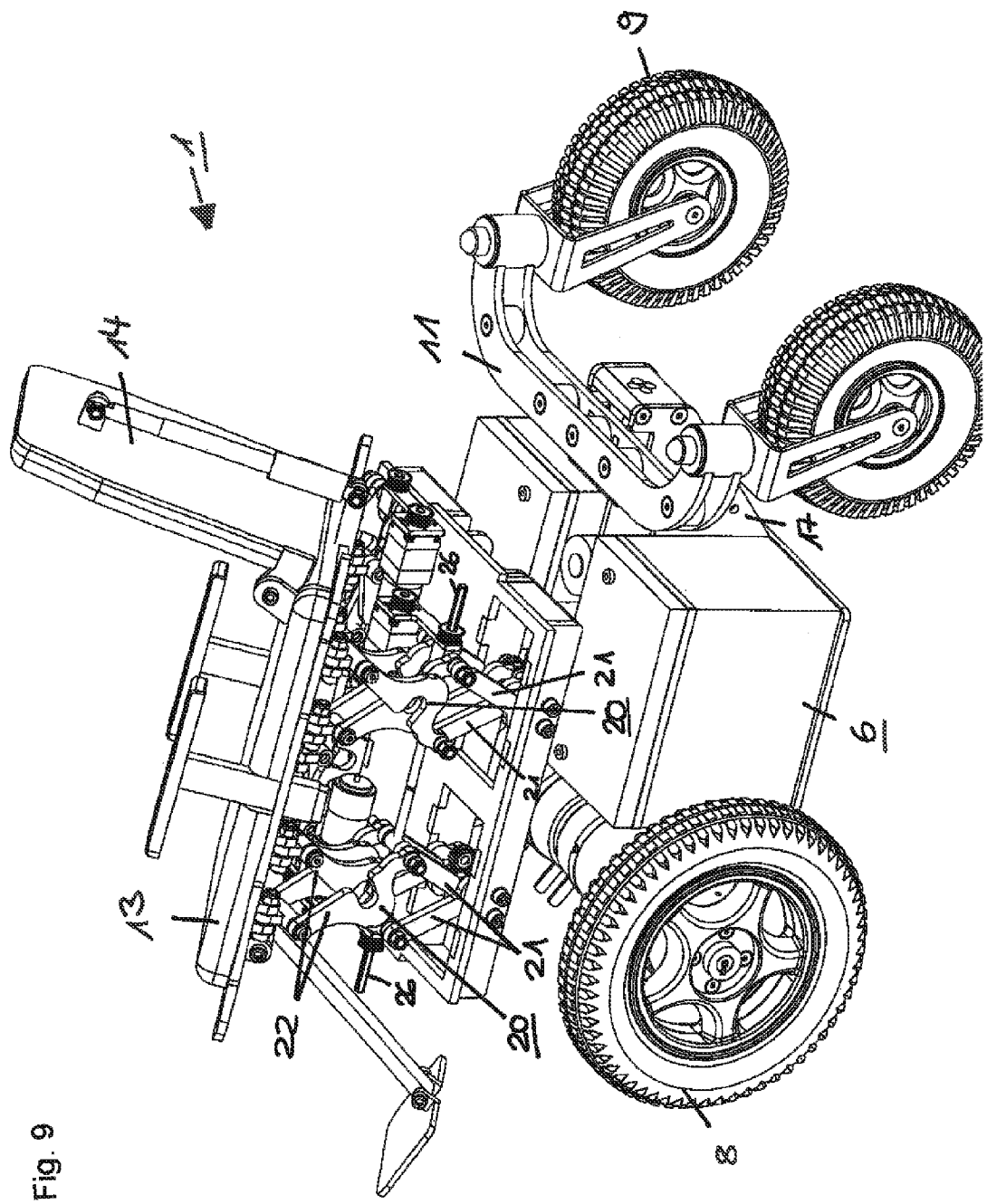

FIG. 9 also shows vehicle 1 with the front driving wheels 8, the back wheels 9, and the pendulum axle 11, which is connected to the vehicle underbody 6 through a console 17 in a perspective side view. Both the seat 13 and the back rest 14 are tilted to a side. In order to achieve this, the two scissor fittings 20 have been moved into a higher position with the aid of the corresponding driving motors 29 and the threaded spindle 26, so that the lower scissor elements 21 and the upper scissor elements 22 were transferred into an practically vertical position. This position is not yet the maximum position. The further scissor fittings 20 on the opposite longitudinal side are in a lower position, so that a sideways tilting is achieved. The tilting could just as well occur in the opposite direction in case the corresponding scissor fittings 20 are activated.

Figure 10:
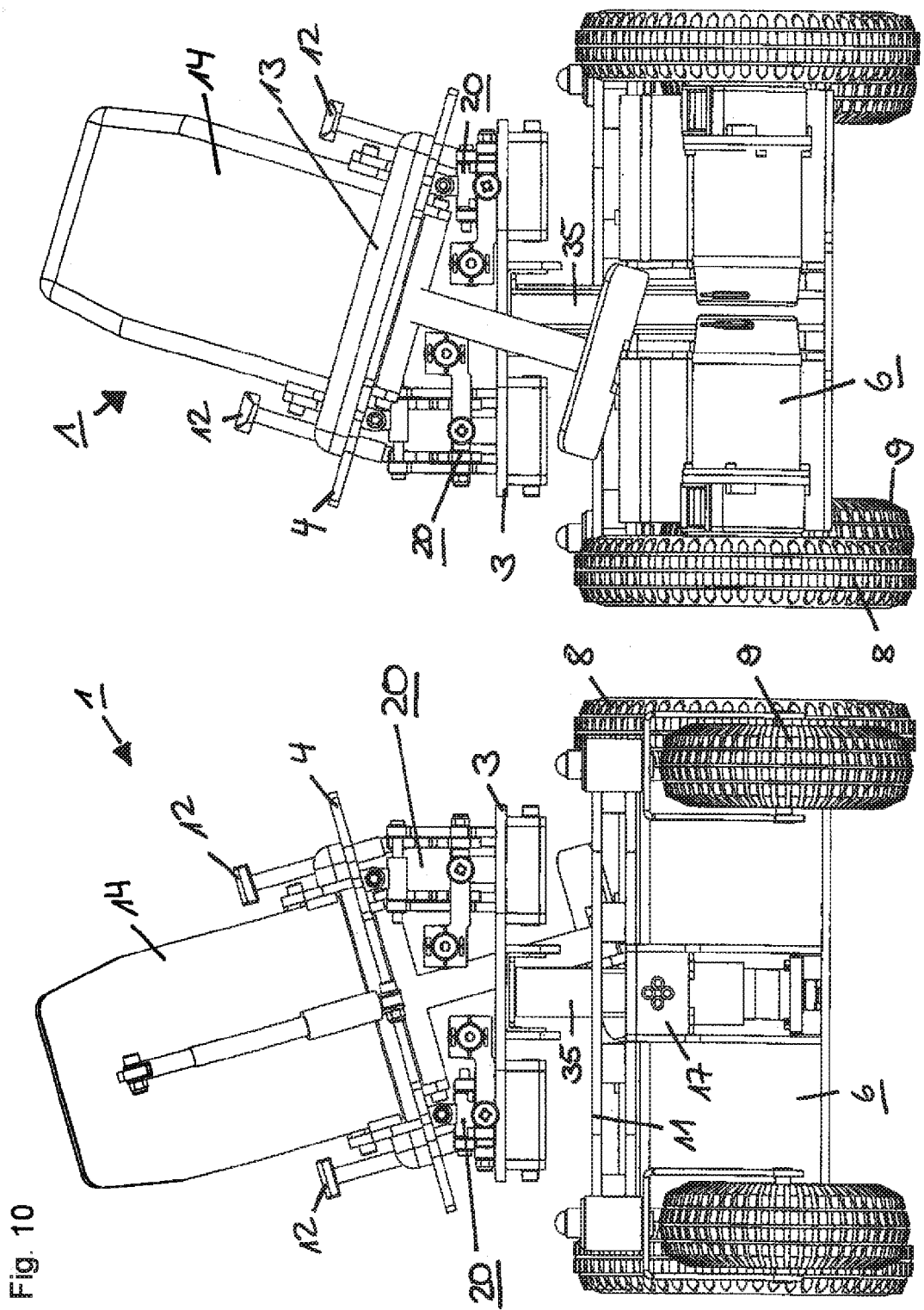

FIG. 10 shows the vehicle 1 according to FIG. 9 in a front and back view. This view once more illustrates which scissor fittings 20 are lifted and which remain in the lower position. Basically, this embodiment of vehicle 1 does not differ from the one described in the previous figures, merely a sideways tilt is adjusted with the aid of the scissor fittings 20.

Figure 11:
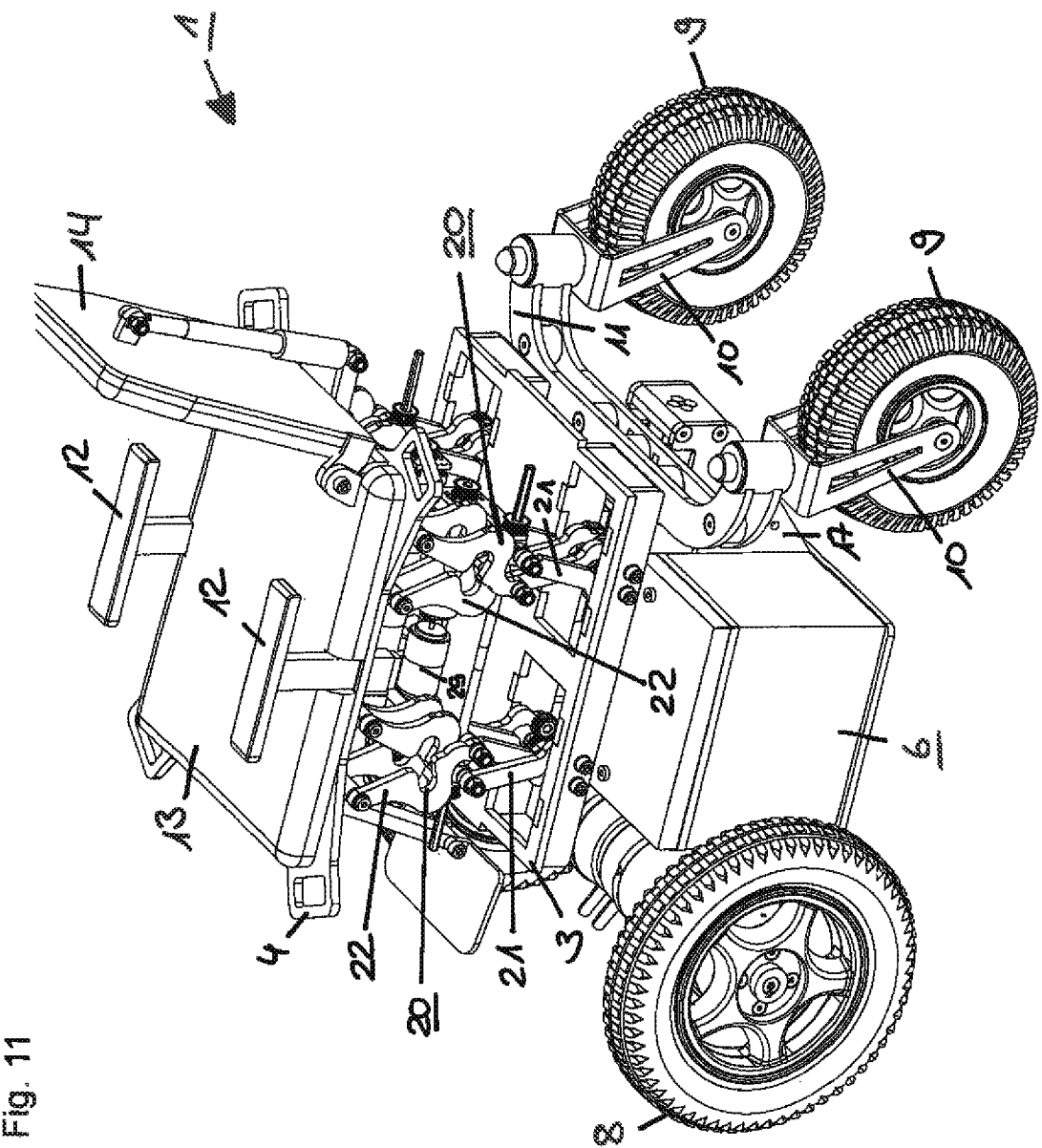

FIG. 11 shows vehicle 1 as well in a perspective side view, while the four scissor fittings 20 were all lifted into a practically vertical position with their lower scissor elements 21 and their upper scissor elements 22, so that the seat 13 with the back rest 14 was moved into a maximum lifted position.

Figure 12:
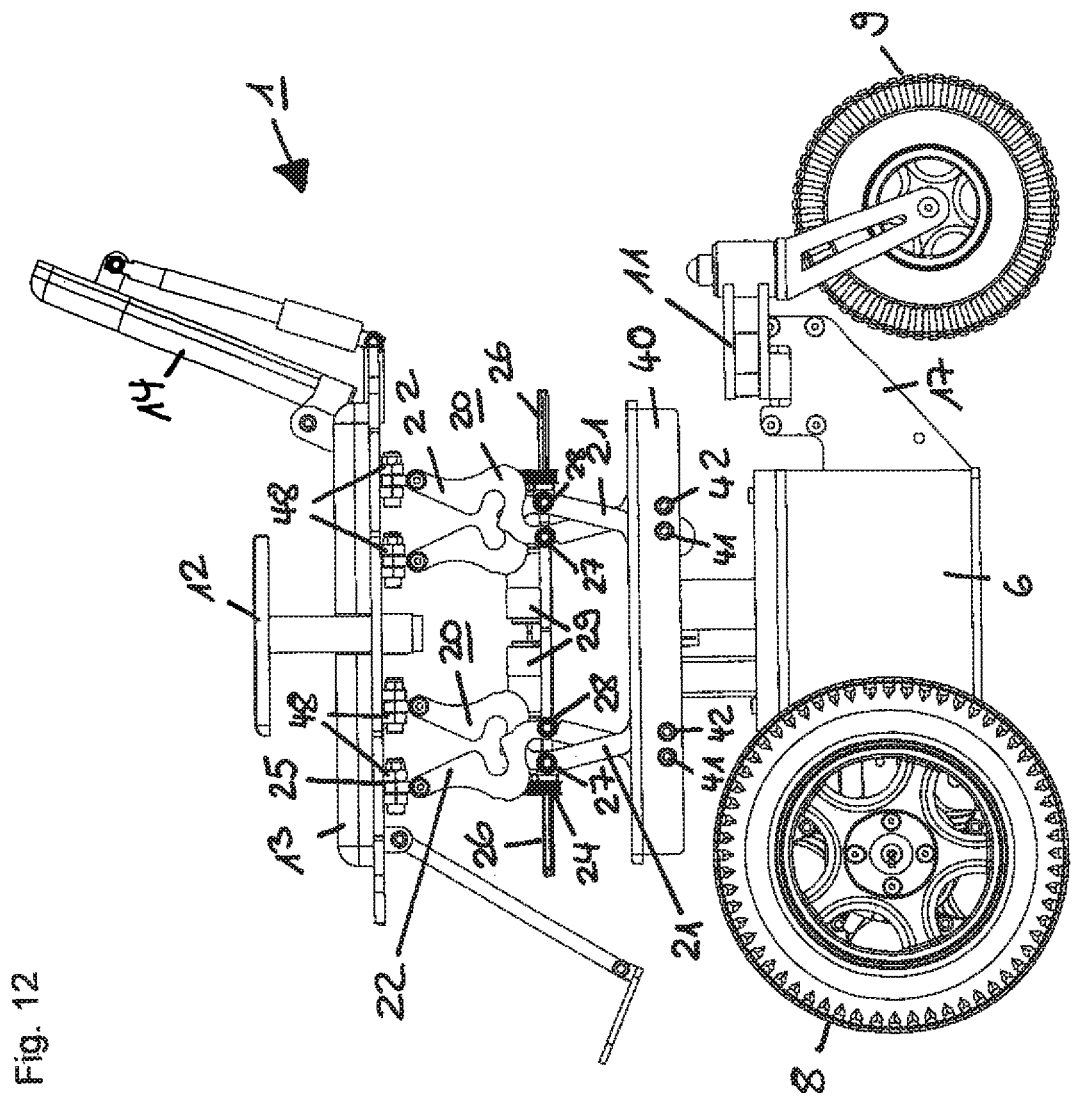

FIG. 12 shows the vehicle 1 according to FIG. 11 in a maximum lifted position of the seat 13 and arm rest 14. It is apparent from this view, that the respective scissor fittings 20 with their lower scissor elements 21 and the upper scissor elements 22 were arranged in a practically vertical alignment with the aid of the driving motors 29 and the threaded spindle 26. This view further illustrates, that the lower scissor elements 21 with their lower pivot point 23 are arranged in the box-shaped underbody 40 through the rotation axles 41, 42, and that the upper pivot points 25 are connected with the bearing plate 4 through a console 48, while the central pivot points 24 allow for a connection of the upper and lower scissor elements 21, 22, while the threaded spindle 26 is fixed in the area of the pivot points 24 with the aid of the spindle bracket. When rotating the threaded spindle 26 through the driving motors 29, the rotation axles 27, 28 are moved towards or away from each other, due to which the deviation of the upper and lower scissor elements 21, 22 occurs.

FIG. 12 depicts the maximum position of the height adjustment of the seat, while the seat can additionally be moved to the front and back of the vehicle underbody 6 on a feed rail. This movement, however, can be achieved independently of an adjustment of height of the seat 13, a tilting to the left or right or to the front or back.

Figure 13:
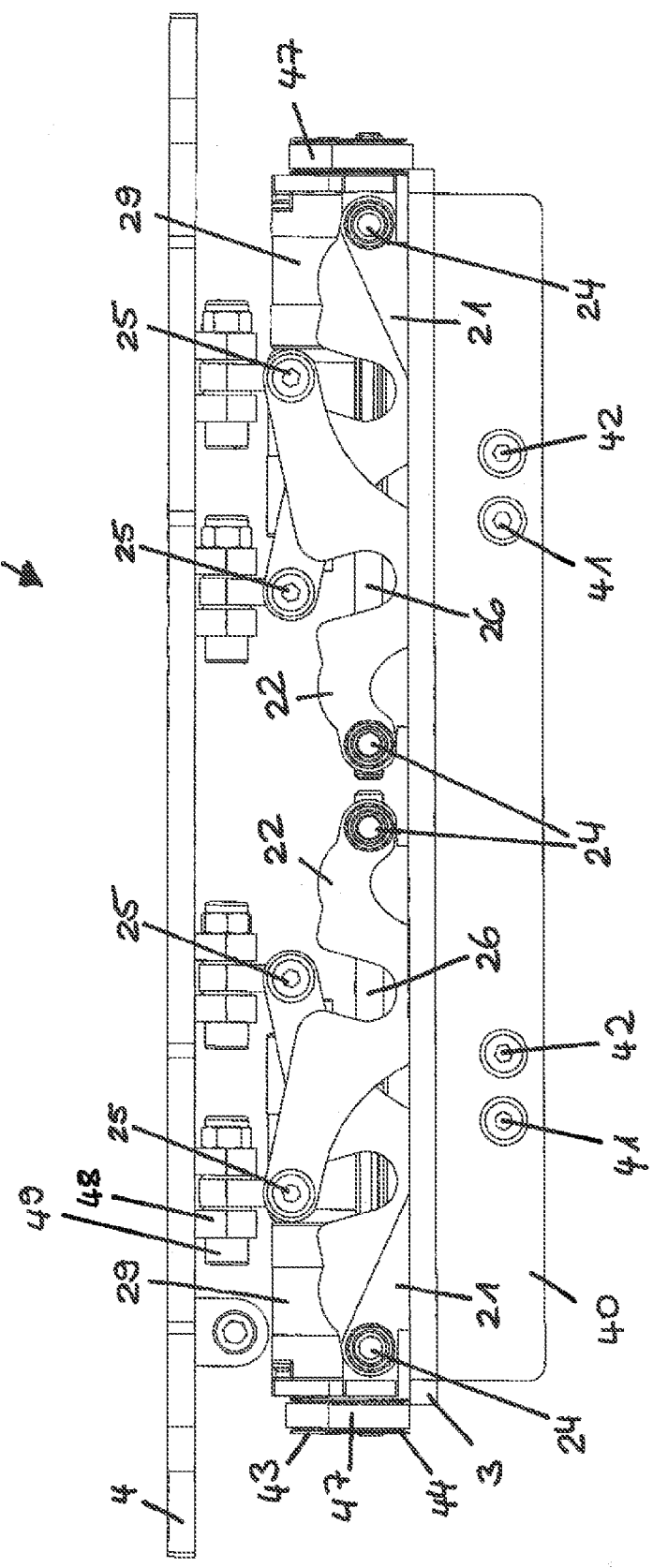

FIG. 13 shows the lifting device 5 without seat and vehicle underbody. The lifting device 5 consists of the lower mounting plate 3 and an upper bearing plate 4, which is used for the mounting of the seat or a seat construction. The lower mounting plate 3 features a circumferential box-shaped underbody 40, which is intended for the mounting of the rotation axles 41, 42. The rotation axles 41, 42 constitute the lower pivot point 23 of the lower scissor elements 21, while the lower and upper scissor points 21, 22 are connected flexibly to each other in the pivot points 24. A threaded spindle 26 is connected through a spindle bracket, while the spindle bracket is arranged directly on the axle of the pivot points 24. Insofar as a toothed timing belt 47 is used for the driving of the driving motor 29, the shaft of the driving motor 29 is allocated to a driving pinion 43 or, respectively, a sprocket wheel 44 of the threaded spindle 26. The upper pivot points 25 of the scissor elements 22 consist of a rotation angle, onto which a sliding sleeve is arranged movably, while the sliding sleeve is pivotably connected. Each upper pivot point 25 of the upper scissor elements 22 is connected in this way with the bearing plate 4.

Figure 14:
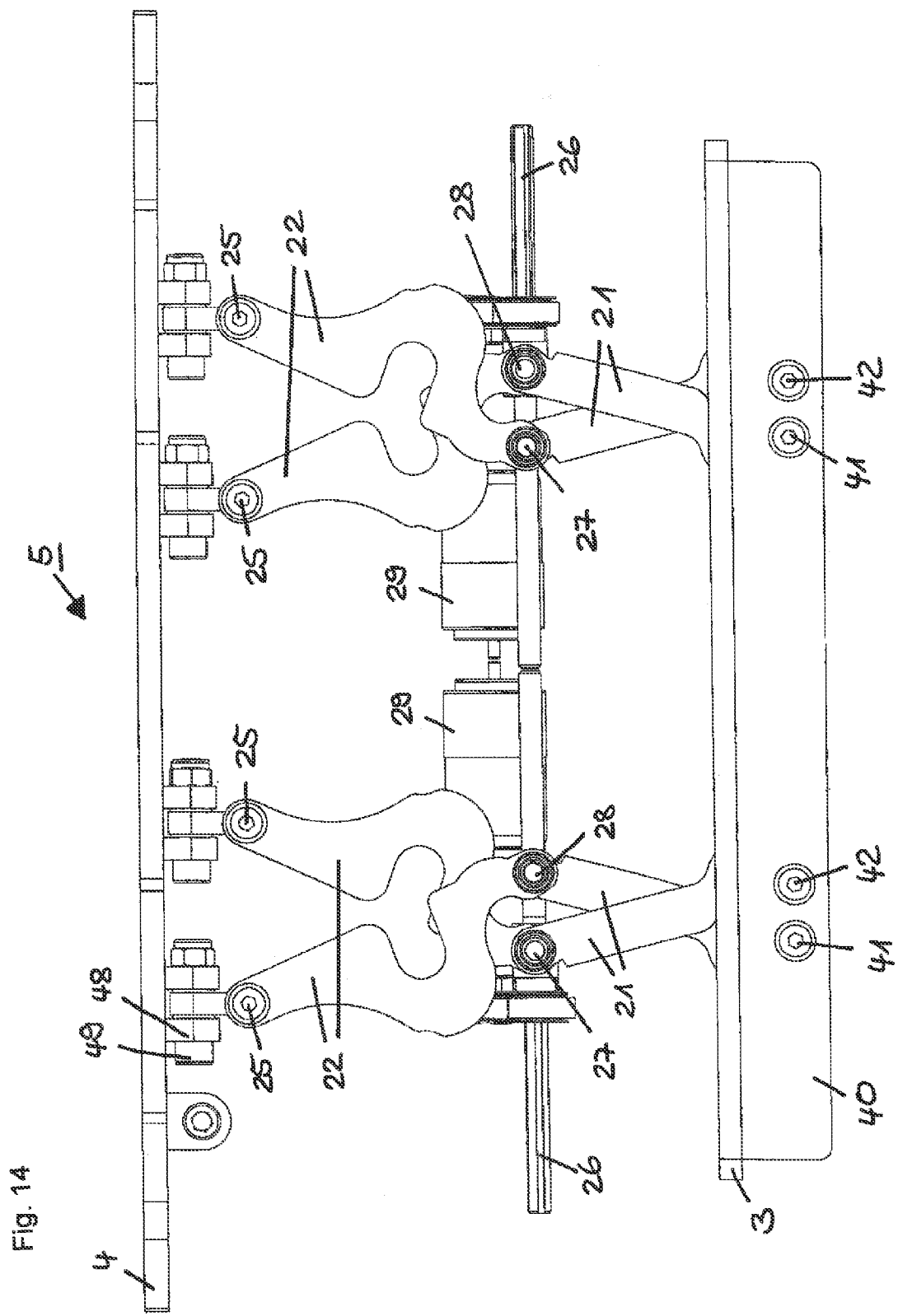

FIG. 14 shows the lifting device 5 in a side view, in which the scissor elements 21, 22 are aligned in a practically vertical heightened position, which was achieved with the help of the threaded spindle 26, which was rotated with the aid of the driving motors 29. In this position the bearing plate 4 is lifted almost parallel to the mounting plate 3, so that merely an adjustment of height for the seat occurs.

Figure 15:
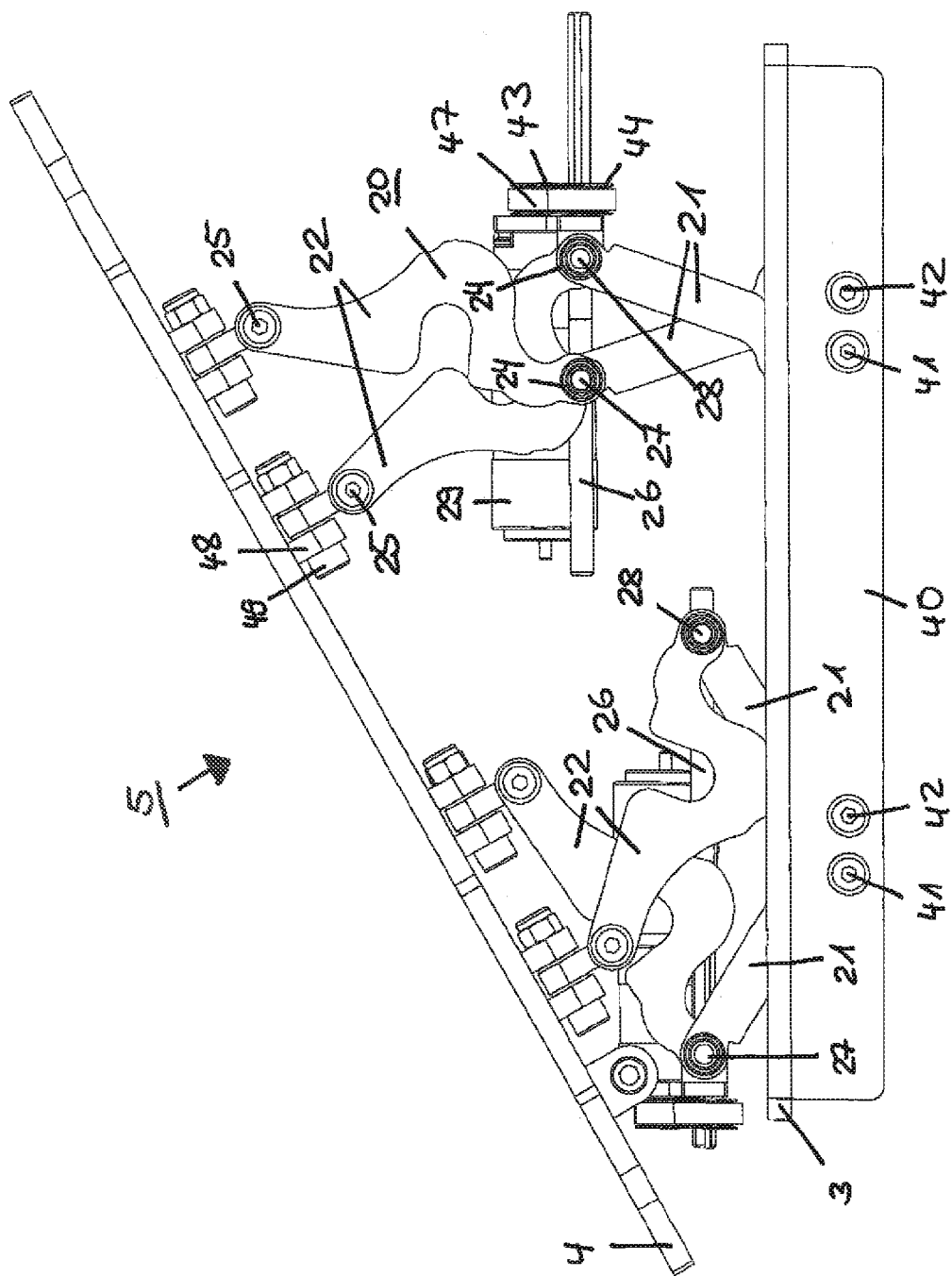

FIG. 15 shows a lifting device 5 with a tilted bearing plate 4, which has been lifted with the aid of two scissor fittings 20 in a side view. Here the threaded spindle 26 is rotated in such a way through the driving motor 29, that the two rotation axles 27, 28 of the pivot point 24 were moved towards each other, while the pivot points 24 of the further two scissor fittings 20 were rotated into a distanced position. The front scissor fittings 20, shown on the left, are only as much aligned as it is necessary for the dislocation of the bearing plate 4 when raising the back scissor fittings 20, shown on the right side. The free movement of the upper scissor elements 22 allows for the adjustment to the tilting angle of the bearing plate 4.

Figure 16:
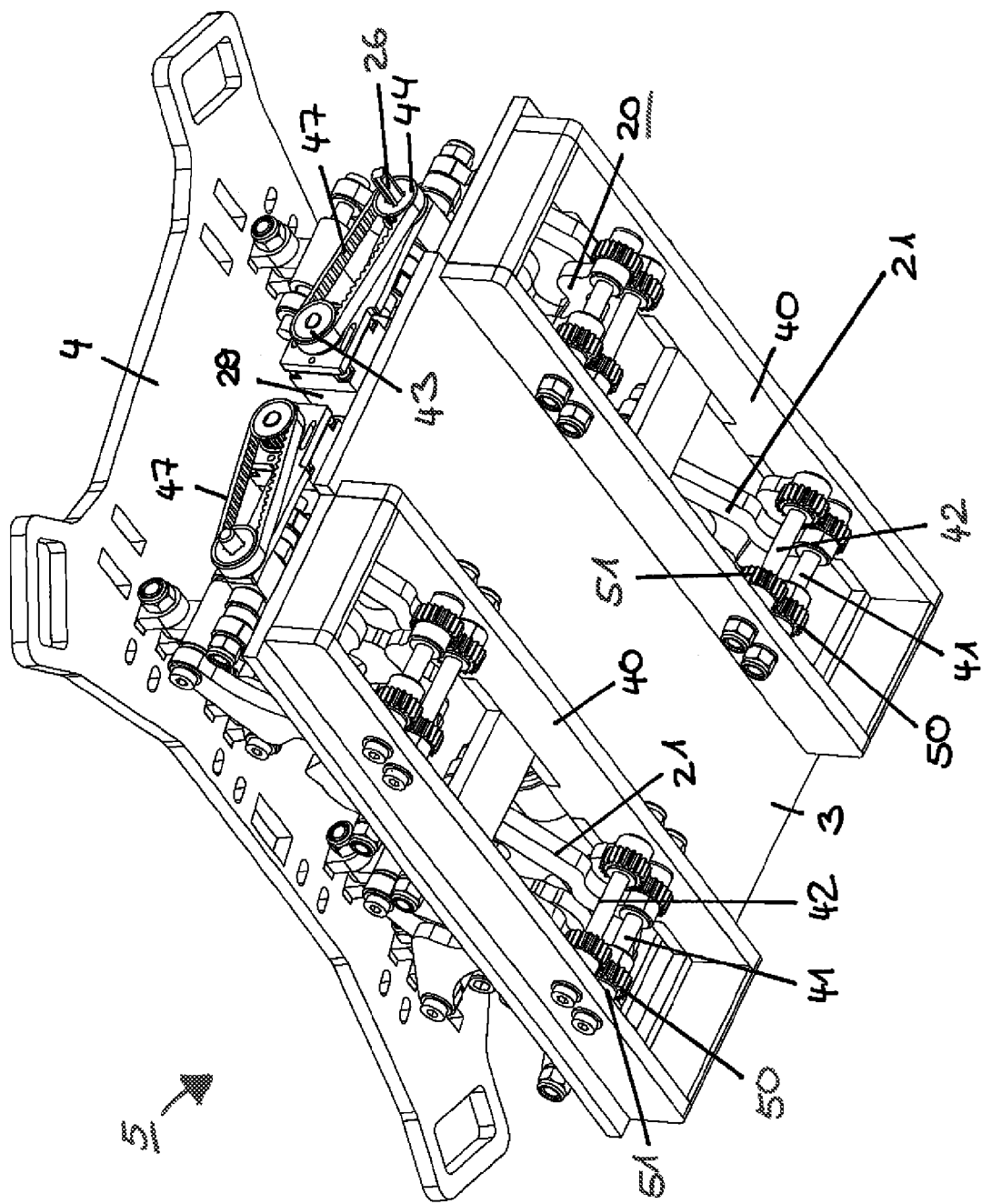

FIG. 16 shows the lifting device 5 with its mounting plate 3 and bearing plate 4, as well as the box-shaped underbody 40 in a perspective bottom view. The underbody 40 acts as a storage for the eight rotation axles 41, 42, to fix the respective scissor fittings 20 in the lower area. Respective gear pairs 50, 51 are arranged on the rotation axles 41, 42, which comb together and are responsible for the synchronized displacement of the lower scissor elements 21 with regard to the scissor fittings 20 and the angles of the scissor elements 21 to each other. This view further shows, that the threaded spindle 26 is driven through its sprocket wheel 44 through a toothed timing belt, which is arranged on the driving pinion 43 of the driving motor 29. Each scissor fitting 20 is allocated such a driving unit, so that an independent movement of the scissor fittings 20 becomes possible. The driving motors 29 are arranged in pairs in the intermediate area between the scissor fittings 20, so that in spite of the available driving motors the scissor fittings 20 can be lowered into a lowest position. Therefore, the construction height of the lifting device 5 can be minimized and is only determined by the height of the individual scissor elements 21, 22, which are arranged to lie next to each other.

Figure 17:
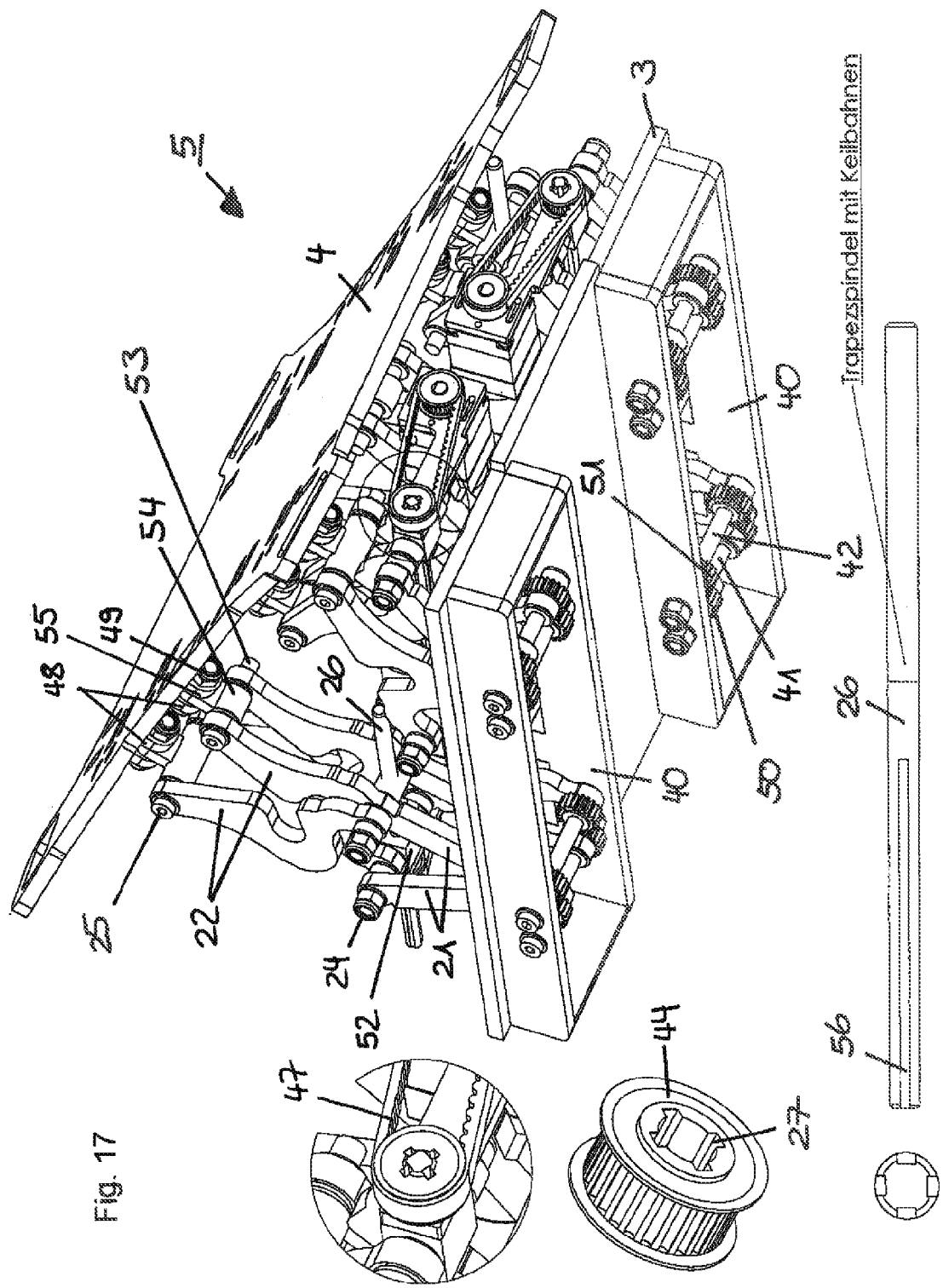

FIG. 17 shows the lifting device 5 as known from FIG. 16 in a perspective bottom view. In this case, only the bearing plate 4 opposite the mounting plate 3 is shown in a tilted position, which shows the way in which the lower scissor elements 21 are connected to the upper scissor elements 22 in the pivot points. This view illustrates, that two pairs of lower scissor elements 21 and two pairs of upper scissor elements 22 each are connected by a rotation axle, starting from each pivot point 24, which are each provided with a spindle bracket 52 for the reception of the threaded spindle 26, so that the pivot points 24 can move towards or away from each other when the threaded spindle 26 is rotated. Furthermore, this view shows the upper pivot point 25 of the upper scissor element 22. Two scissor elements 22 are connected in pairs to the rotation axle, onto which a sliding sleeve 54, which is set with a radial attachment piece 55 in a console 48 with rotation axle 49, can be moved back and forth. The sliding sleeves 54 allow for a lateral misalignment, in case a diagonal or sideways tilting towards the mounting plate 3. e.g., is requested.

Further, a detailed view shows the threaded spindle 26, which is provided with four grooves 56, arranged in 90° on each side, onto which a sprocket wheel 44 can be slid on, which features a corresponding gap for the threaded spindle 26 with grooves 56 for the reception of sliding blocks. Thus, a rotation is prevented, whereat the toothed timing belt lies on the sprocket wheel 44. From this view the console 48 of the bearing plate 4 is also apparent, in which a rotation axle 49 is located, onto which the attachment piece 55 is slid. The sliding sleeve 54 lies on a rotation axle 53, so that with a tilting of the bearing plate 3 a sideway dislocation of the sliding sleeve 54 on the rotation axle 53 is possible, to avoid possible transverse stress.

Figure 18:
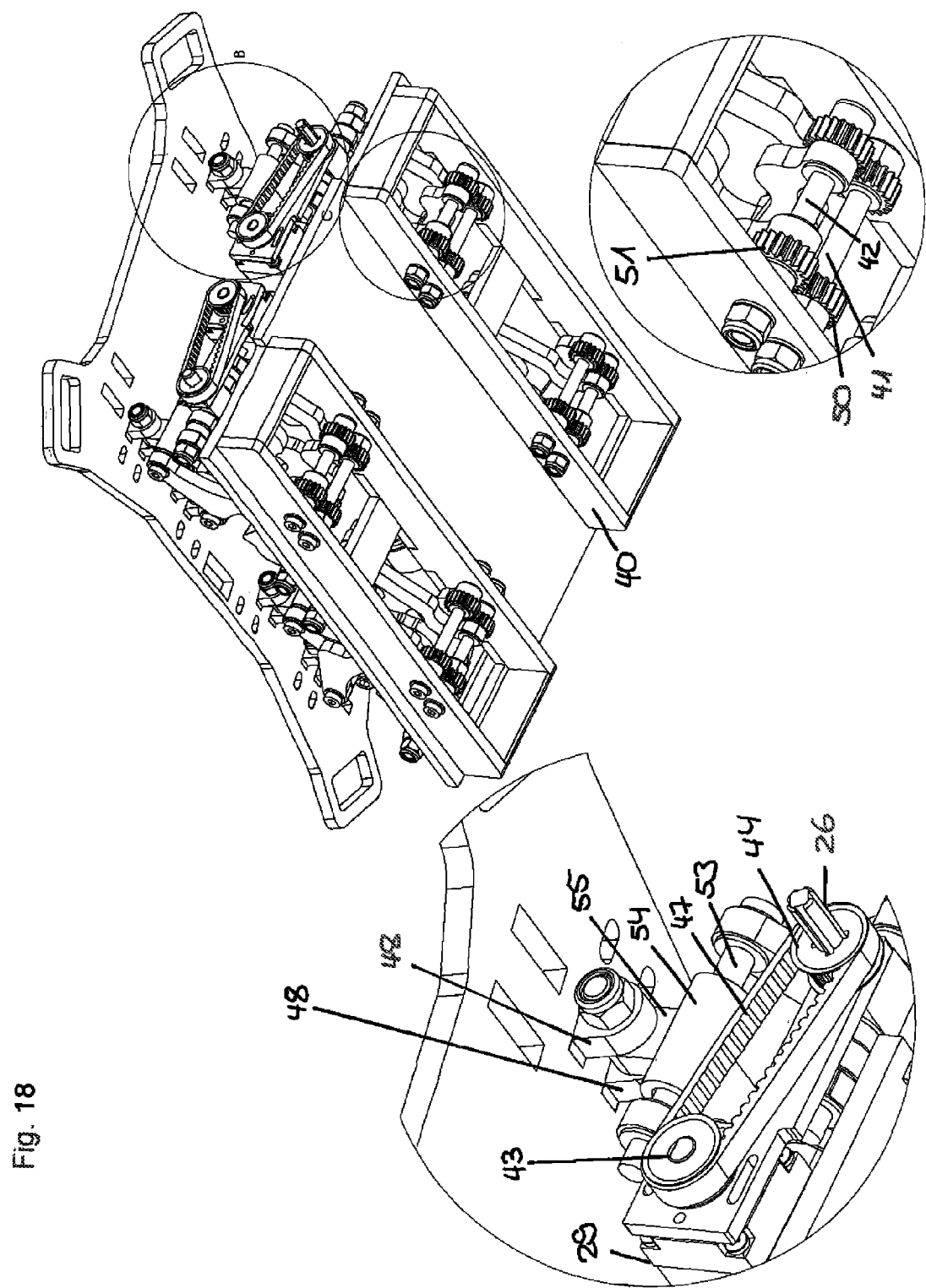

FIG. 18 shows once more the lifting device 5 as it is already known from the previous figures, in particular from FIG. 17, whereat the connection between the threaded spindle 26 and the driving motor 29 is shown in an enlarged detail view, whereat the connection occurs through a first sprocket wheel 44 and a driving pinion 43 through a toothed timing belt. In a further partial view, the lower pivot point with the rotation axles 41, 42 is shown, onto which a gear pair 50, 51 each is arranged rotably, which are connected non-rotably with the scissor elements 21 and which comb together and consequently ensure a stabilizing movement of the individual scissor fittings 20.

Figure 19:
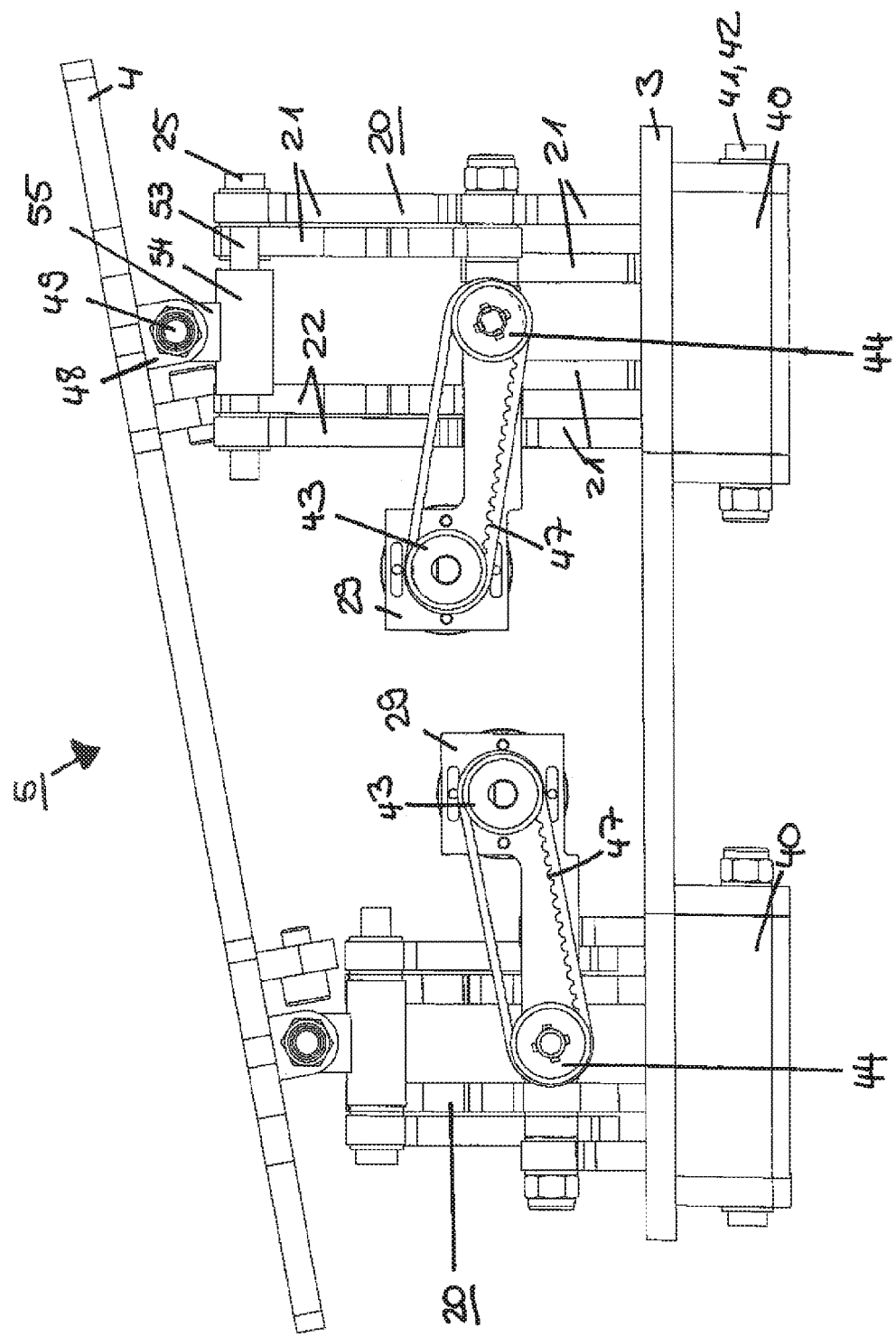

FIG. 19 shows the lifting device 5 with the driving motors 29 and toothed timing belts 47, which are each arranged on a driving pinion 43 or a respective sprocket wheel 44. From this view it is apparent that the scissor fitting 20 each consist of four lower scissor elements 21 and four upper scissor elements 22. The scissor elements are entirely arranged in misalignment, so that they can be moved from a practically horizontal position into a practically vertical position with the aid of the driving motors 29 without touching each other. All scissor elements 21, 22 are connected to rotation axles at the end, whereat in the lower area two respective lower scissor elements 21 are connected to a rotation axle 41 and the remaining ones are connected to a rotation axle 42. Each of those scissor elements 21 are connected that are moved into the same direction. The upper scissor elements 22 are also each connected in pairs through a rotation axle, whereat the upper scissor elements 22 are again arranged on a rotation axle moving into the same direction. From this view it is further apparent, that the sliding sleeve 54 is arranged on a rotation axle 53, namely in the upper pivot point 25, and the sliding sleeve 54 is connected with an attachment piece 55 through a pivot point 49 and a console 48. This view shows that it becomes necessary to displace the sliding sleeve 54 to the side when a lateral lifting of the scissor fittings 20 occurs only on one side due to the resulting tilt of the bearing plate 4, if the opposite scissor fittings are not lifted simultaneously.

Figure 20:
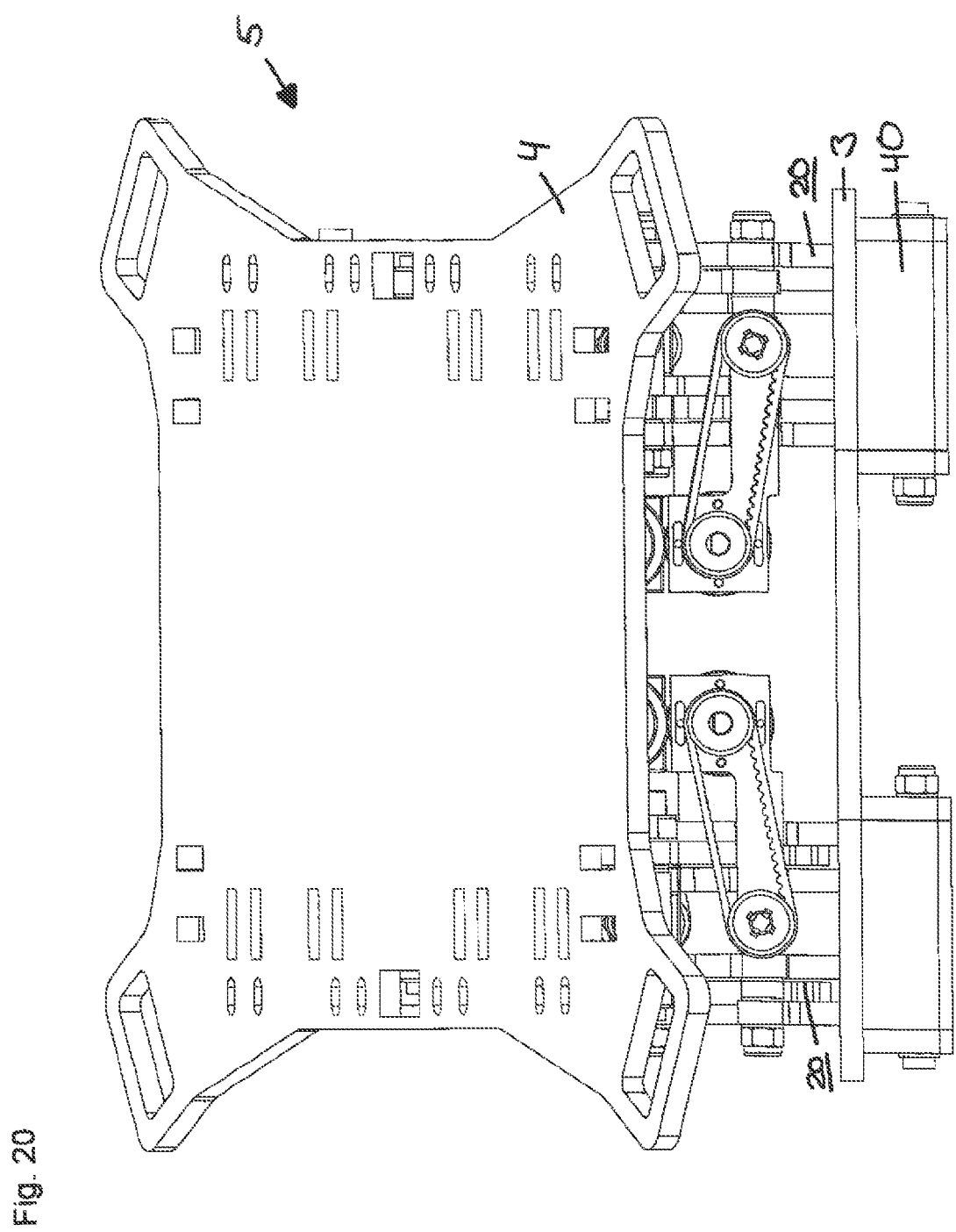

FIG. 20 shows the lifting device 5 in a further back view, in particular from a point of view onto the tilted bearing 4 opposite the mounting plate 3. In this case, the front scissor elements 21 remained in the lower position, while the hidden scissor elements 20, as they can be seen in FIG. 19, e.g., are lifted.

Figure 21:
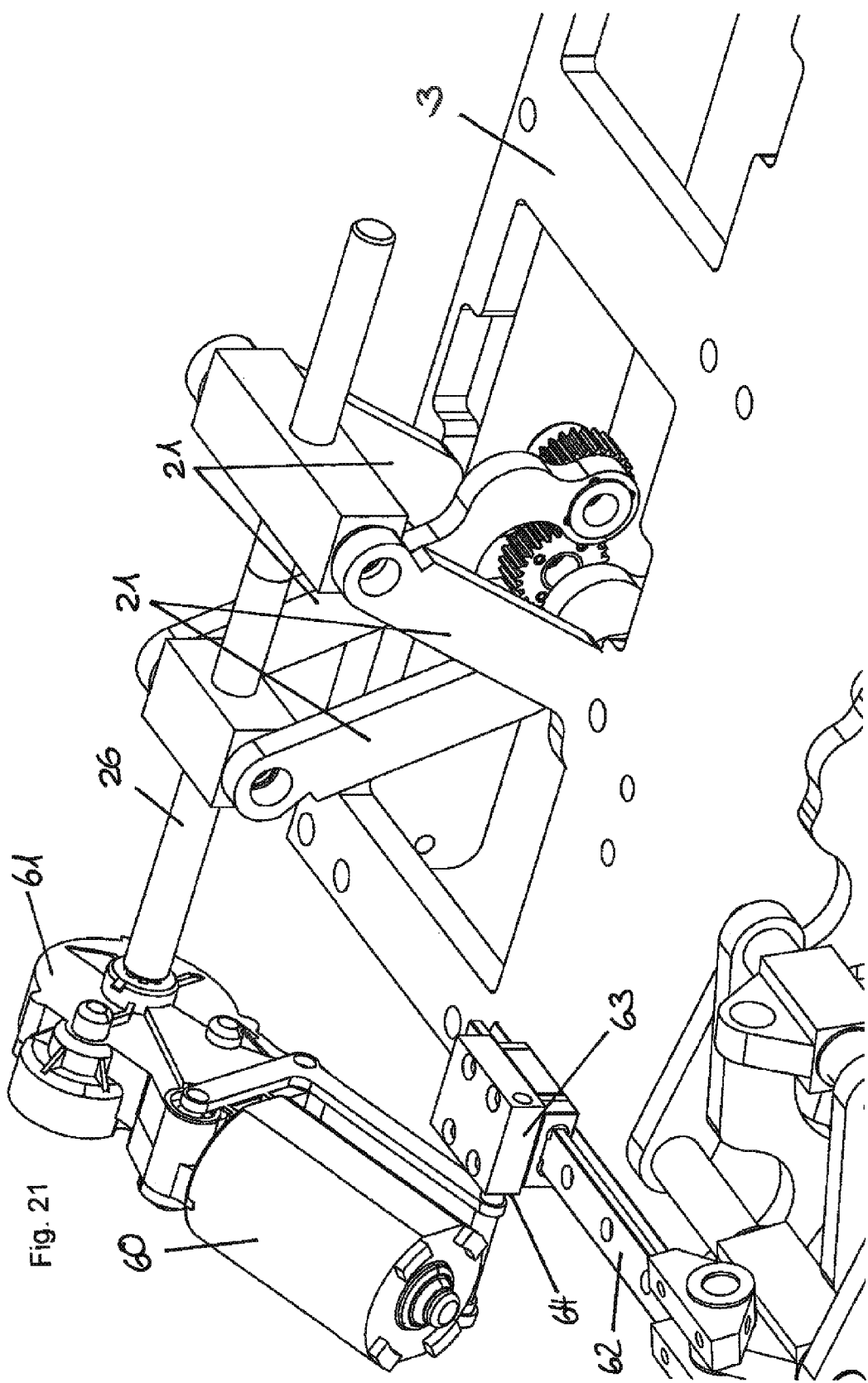

FIG. 21 shows the mounting plate 3 and two lower scissor elements 21, which are arranged in pairs, in a perspective partial view. The threaded spindle 26, which is provided with a driving motor 60 at one end, is found between the scissor elements. The driving motor 60 comprises a gear speed 61, which is deferred with an internal toothing onto the toothed threaded spindle 26 at one end. The driving motor 60 is pivotably mounted with the aid of a guide track 62, such a trazoidal track, onto which a guide sled 63 is moveably attached as a gliding shoe. The driving motor 60 is connected in a pivot point 64 with the guide sled, so that a swiveling movement becomes possible, namely, dependent on the set height of the threaded spindle 36 when the scissor elements 21 move together. Here, the adjustment device contains scissor elements 21 in the respective corner points of the mounting plate, so that four threaded spindles 26 are available, and thus four driving motors 60 have to be provided. Each scissor fitting with its scissor elements 21 can therefore be individually and independently adjusted in height to allow for the desired position of the bearing plate, which is not shown in this figure.

Figure 22:
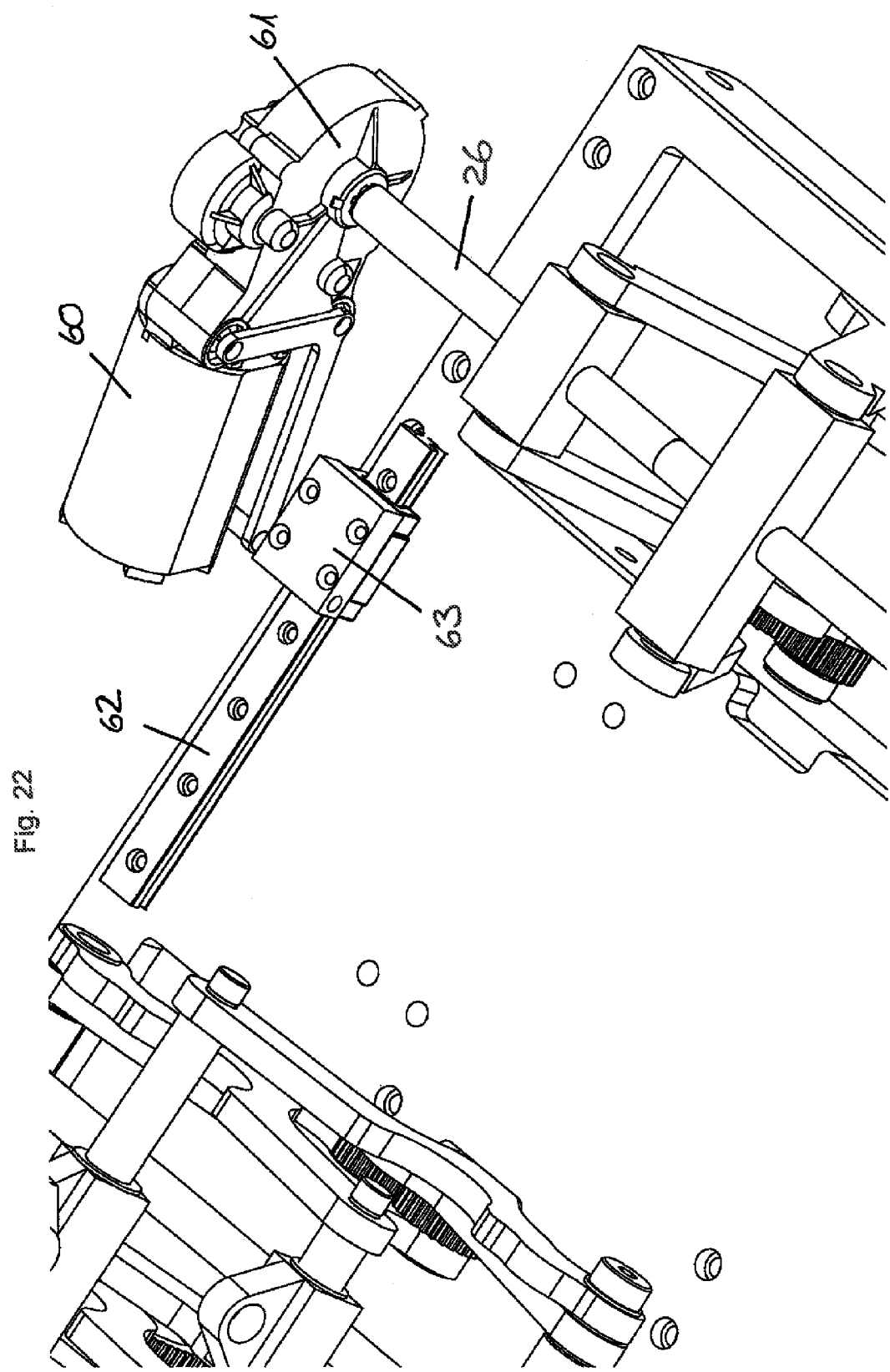

FIG. 22 shows the driving motor 60 with gear speed 61, which is attached onto the threaded spindle 26 in a perspective partial view. The guide track 62 with the guide sled 63 can be seen from this view.

Figure 23:
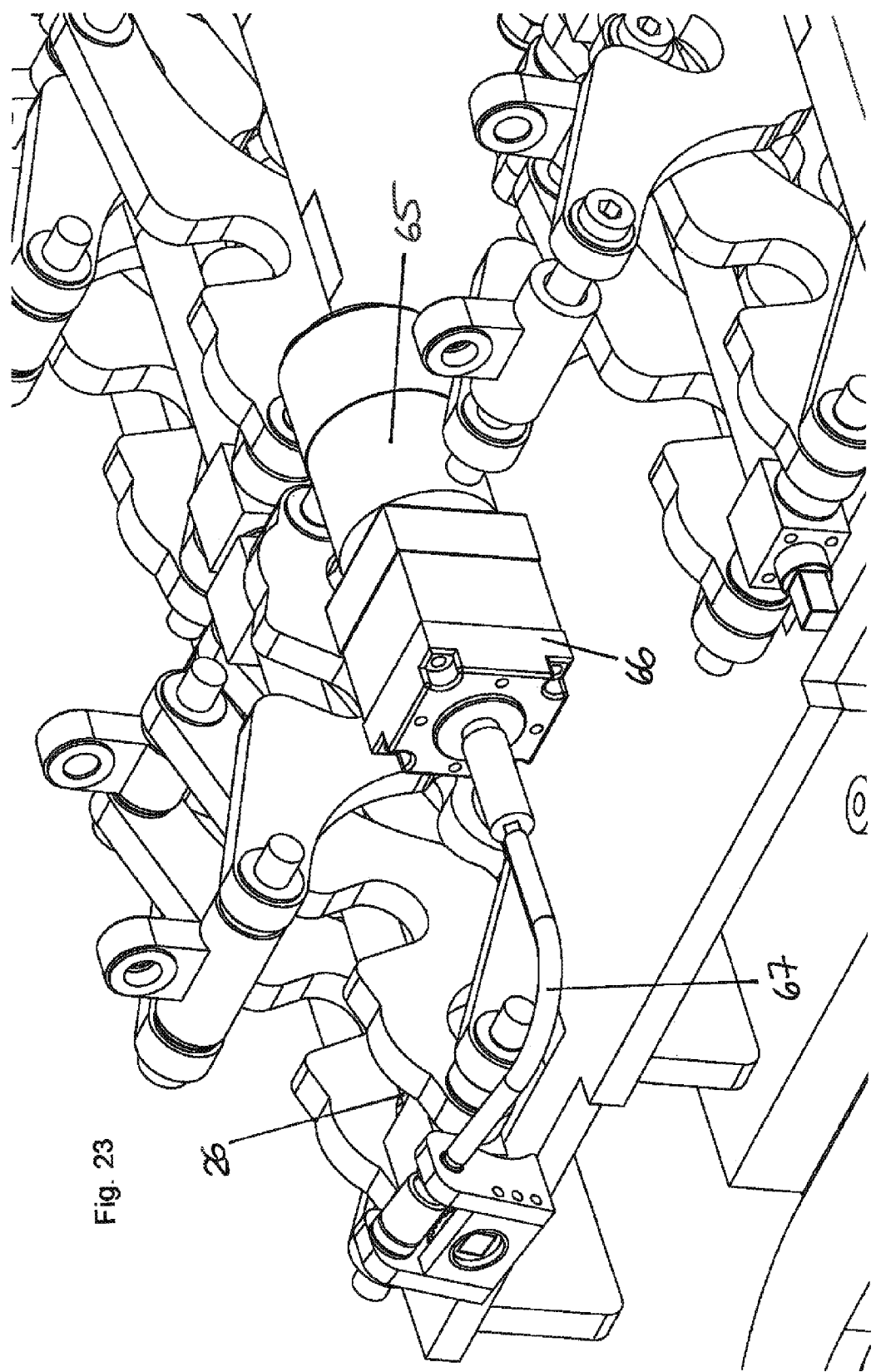

FIG. 23 shows a further alternative driving unit with the aid of a driving motor 65, a gear speed 66 and a flexible shaft 67 in a perspective partial view. The driving motor 65 is arranged in parallel to the threaded spindle 26, and can thus be arranged between the available scissor fittings or virtually anywhere it is desired. The flexible shaft 67 directly drives the threaded spindle 26 through its toothing, so that an independent adjustment in height can be achieved for each scissor fitting with lower scissor elements 21 with this concept of driving as well.

Figure 24:
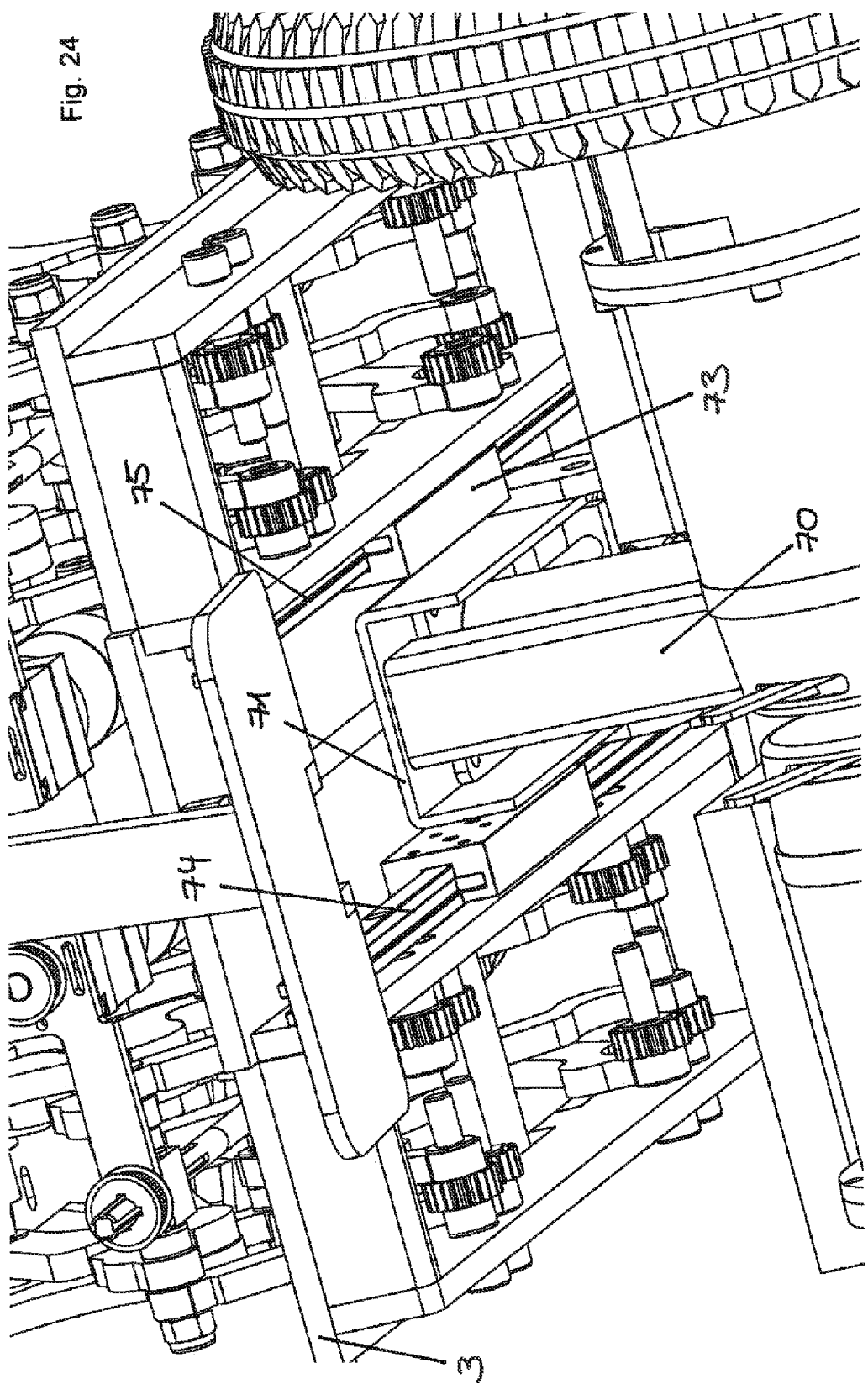

FIG. 24 shows the mounting plate 3, which is connected through a support with the vehicle underbody 6 in a lower partial view. The support 70 has a u-shaped bent profile 71 at the top end. The profile 71 is connected to two linear drive units 72, 73, which can slide back and forth on a feed rail 74, 75. The linear drive units 72, 73 are also controlled through the available control unit of the vehicle, and thus allow for a displacement of the entire superstructure with the bearing plate 4 and the seat 13 in the direction of driving or in the opposite direction, so that an individual adjustment of the seat and a compensation of the center of gravity can occur.

FIG. 25 shows the arrangement of the control unit 76, which is arranged between the mounting plate 3 and the bearing plate 4, which is essential for the independent adjustment of the available scissor fittings 20 in a perspective partial view. A gyro sensor 77, which is connected through a cable 79 with the control unit 76, is found below the bearing plate 4. The control unit 76 is also provided with a gyro sensor 78, so that the position of the mounting plate 3 can be measured in relation to a fixed set angle of the bearing plate with the aid of the two gyro sensors. When the bearing plate 4 with the mounted seat is moved into a certain position, which could be beneficial for the user, it is possible to re-adjust the scissor fittings 20 during the use on uneven terrain, which is synonymous with a dislocation of the upper and lower gyro sensors. This merely requires a re-setting of the previously known data of the gyro sensors 77, 78 and the corresponding differences due to varying directions, in particular by adjusting the height of each scissor fitting 20. Thus, it is possible to have a fully automatic re-adjustment of the seat position during a continuous drive on uneven terrain, without the need for the user of the wheelchair to intervene.

FIG. 26 shows a rotation axle 41 with a gear 50 in a perspective bottom view. In order to grasp the exact angle position an angle transmitter 80 is integrated, which is fixed on a mounting block 81 and which is provided with a drive pinion gear 82. Two further gears 83, 74 are arranged between the gears 50 and the drive pinion gear 82, which allow for a gear reduction, so that the stroke movement of the lower scissor elements 21 leads to a geared-down rotation of the drive pinion gear 82 and only the angle transmitter can be controlled directly, which generally contains only an angle range of about 270°.

LIST OF REFERENCE NUMERALS 1 vehicle
2 adjustment device
3 mounting plate
4 bearing plate
5 lifting device
6 vehicle underbody
7 housing
8 driving wheel
9 wheel
10 intake
11 pendulum axle
12 arm rest
13 seating
14 back rest
15 adjustment device
16 pivot point
17 console
20 scissor fitting
21 scissor element
22 scissor element
23 pivot point
24 pivot point
25 pivot point
26 threaded spindle
27 rotation axle
28 rotation axle
29 driving motor
30 toothed timing belt
31 foot rest
35 support
36 profile
40 underbody
41 rotation axle
42 rotation axle
43 driving pinion
44 sprocket wheel
45 driving motor
46 driving motor
47 toothed timing belt
48 console
49 rotation axle
50 gear
51 gear
52 spindle bracket
53 rotation axle
54 sliding sleeve
55 attachment piece
56 groove
57 groove
60 driving motor
61 gear speed
62 guide track
63 guide sled
64 pivot point
65 driving motor
66 gear speed
67 shaft
70 support
71 profile
72 linear drive unit
73 linear drive unit
74 feed rail
75 feed rail
76 control unit
77 gyro sensor
78 gyro sensor
79 cable
80 angle transmitter
81 assembly block
82 drive pinion gear
83 gear
84 gear

The invention claimed is:

1. Adjustment device for vehicles, comprising at least one mounting plate and one bearing plate with a lifting device, which comprises at least one scissor fitting,
wherein
the lifting device comprises at least two scissor fittings, which are arranged at the longitudinal edge or in a corner region of the respective mounting plate or bearing plate and which are adjustable in height by driving means, and
wherein
the scissor fittings are adjustable in height independent from each other.

2. Adjustment device according to claim 1,
wherein
each scissor fitting consists of double scissors, and/or in that each scissor fitting consists of four scissor elements which are arranged in pairs, wherein a respective first lower and a second upper scissor element exist, and/or in that the scissor elements of a scissor fitting are such arranged in offset levels that there is no contact.

3. Adjustment device according to claim 1,
wherein
lower and upper scissor elements are connected in a common pivot point with a rotation axle.

4. Adjustment device according to claim 1,
wherein
each scissor fitting features a first lower scissor element, which is connected in a first pivot point with a console of the mounting plate and in a second pivot point with a rotation axle, and/or in that each scissor fitting features a second upper scissor element, which is connected in a first pivot point with the bearing plate and in a second pivot point with the rotation axle of the first scissor element.

5. Adjustment device according to claim 1,
wherein
the rotation axles of a scissor fitting each feature a spindle bracket, in which a threaded spindle is screwed in, wherein the threated spindle features a right-handed thread at the one end and a left-handed threat at the other end.

6. Adjustment device according to claim 1,
wherein
a threaded spindle of the scissor fittings may be driven by respective driving means, wherein said driving means is an electric, hydraulic or pneumatic motor, which directly drives the threaded spindle or indirectly drives it by means of a toothed timing belt or a flexible shaft.

7. Adjustment device according to claim 1, wherein
a driving means is mounted directly above a corresponding toothing with a gear on the end of a threaded spindle, wherein the driving means is arranged pivotably connected by a carriage guide in order to be able to follow the height movement of the threaded spindle.

8. Adjustment device according to claim 1, wherein
a first pivot point of a second upper scissor element consists of a rotating sliding sleeve, which is arranged on a rotation axle and is connected with the bearing plate, which connects two upper pivot points of adjoining scissor elements, wherein at least one sleeve of the scissor fitting is additionally mounted relocatably on the rotation axle.

9. Adjustment device according to claim 1, wherein
a first pivot point of a first lower scissor element is defined by a respective rotation axle, wherein the rotation axles are arranged in a lower frame, and rotating toothing elements are mounted on the rotation axles.

10. Adjustment device according to claim 1, wherein
the mounting plate is connected with an underbody of a vehicle, and in that a seat with a back rest is fixable on the bearing plate or that the bearing plate is the seat, and/or in that the lifting device features a flat height of less than 12 cm when retracted and is at least partially integrated in a box-shaped underbody.

11. Adjustment device according to claim 1, wherein
the bearing plate is raisable along the edges of the long sides by the scissor fittings, through which a sideway tilting or a lifting of the bearing plate occurs, or in that the bearing plate is raisable in the corners by the scissor fittings, through which the bearing plate is raisable or lowerable in an approximately horizontal position and an additional tilting to the sides, to the front, and to the back, or a diagonal relocation of the bearing plate occurs.

12. Adjustment device according to claim 1, wherein
the mounting plate is connected to at least one feed rail and the feed rail is mounted in a linear drive unit, wherein the linear drive unit is tightly connected with the vehicle underbody, and wherein the feed rail is moveable through a toothed rack, a belt, a spindle, or a linear motor with respect to the vehicle underbody.

13. Adjustment device according to claim 1, wherein
the movement of lower scissor elements is limited by an end switch, and/or in that the movement of the lower scissor elements is ascertainable through a toothing element and an angle transmitter, wherein the toothing element cogs a toothed part of the first pivot point, and/or in that the movement of the lower scissor element can be monitored by means of a speed sensor through the rotation of the threaded spindle.

14. Adjustment device according to claim 1, wherein
the mounting plate features at least one rubber buffer onto which the bearing plate rests in the lower position, and/or in that the mounting plate and the bearing plate are each equipped with a gyro sensor, which is coupled with a control unit of the driving means.

* * * * *